United States Patent
Park et al.

(10) Patent No.: US 10,761,417 B2
(45) Date of Patent: Sep. 1, 2020

(54) SMART WATCH AND METHOD FOR CONTROLLING SAME

(71) Applicant: LG ELECTRONICS INC., Seoul (KR)

(72) Inventors: Jinyung Park, Seoul (KR); Hongjo Shim, Seoul (KR); Hyeokjin Kwon, Seoul (KR); Hanna Lee, Seoul (KR); Seonghyok Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 12 days.

(21) Appl. No.: 15/771,296

(22) PCT Filed: Jan. 15, 2016

(86) PCT No.: PCT/KR2016/000455
§ 371 (c)(1),
(2) Date: Apr. 26, 2018

(87) PCT Pub. No.: WO2017/094962
PCT Pub. Date: Jun. 8, 2017

(65) Prior Publication Data
US 2018/0364557 A1 Dec. 20, 2018

(30) Foreign Application Priority Data

Nov. 30, 2015 (KR) .................. 10-2015-0168586
Nov. 30, 2015 (KR) .................. 10-2015-0168589

(51) Int. Cl.
*G03B 29/00* (2006.01)
*G04B 37/14* (2006.01)
(Continued)

(52) U.S. Cl.
CPC ............. *G03B 29/00* (2013.01); *A44C 5/14* (2013.01); *G03B 17/561* (2013.01); *G04B 37/14* (2013.01);
(Continued)

(58) Field of Classification Search
CPC ...... G03B 29/00; G03B 17/561; G04G 21/00; G04G 17/04; H04N 5/23212;
(Continued)

(56) References Cited

U.S. PATENT DOCUMENTS

2003/0236704 A1* 12/2003 Antonucci ............ G07F 7/1016
705/14.3
2014/0139637 A1* 5/2014 Mistry .................... G06F 1/163
348/46
(Continued)

FOREIGN PATENT DOCUMENTS

EP          3062495       *  3/2015  ............ H04M 1/725
KR   10-2014-0122155 A     10/2014
(Continued)

*Primary Examiner* — Lin Ye
*Assistant Examiner* — Chan T Nguyen
(74) *Attorney, Agent, or Firm* — Birch, Stewart, Kolasch & Birch, LLP

(57) ABSTRACT

A smart watch comprising a camera, and a method for controlling the same are disclosed. The present application can provide a smart watch and a method for controlling the same, the smart watch comprising: a case; a display which is located in the case and is configured to display various types of information including the current time; a band which is connected to the case and is configured to wrap around a user's wrist; and a camera which is provided on the band to obtain images, wherein the camera is configured to be movable so as to be precisely oriented to a subject.

17 Claims, 16 Drawing Sheets

(51) Int. Cl.
*G04B 47/00* (2006.01)
*H04N 5/232* (2006.01)
*G03B 17/56* (2006.01)
*G06K 9/00* (2006.01)
*A44C 5/14* (2006.01)
*H04N 5/225* (2006.01)
*G04G 17/04* (2006.01)
*G04G 21/00* (2010.01)
*F16M 11/04* (2006.01)
*F16M 13/04* (2006.01)

(52) U.S. Cl.
CPC .............. *G04B 47/00* (2013.01); *G04G 17/04* (2013.01); *G04G 21/00* (2013.01); *G06K 9/00255* (2013.01); *G06K 9/00671* (2013.01); *H04N 5/2251* (2013.01); *H04N 5/23212* (2013.01); *H04N 5/23216* (2013.01); *H04N 5/23219* (2013.01); *H04N 5/232935* (2018.08); *H04N 5/232945* (2018.08); *F16M 11/041* (2013.01); *F16M 13/04* (2013.01)

(58) Field of Classification Search
CPC ............. H04N 5/23219; H04N 5/2251; H04N 5/23216; H04N 5/232935; H04N 5/232945; A44C 5/14; F16M 13/04; F16M 11/041; G06K 9/00255; G06K 9/00671; G04B 37/14; G04B 47/00

USPC ..................................................... 348/207.99
See application file for complete search history.

(56) References Cited

U.S. PATENT DOCUMENTS

| | | | | |
|---|---|---|---|---|
| 2014/0300746 | A1* | 10/2014 | Adachi | G06T 7/74 348/159 |
| 2015/0058649 | A1* | 2/2015 | Song | G06F 1/3209 713/323 |
| 2015/0063075 | A1* | 3/2015 | Baek | G04G 17/04 368/10 |
| 2015/0189150 | A1* | 7/2015 | Morisawa | G03B 17/561 348/211.8 |
| 2015/0189178 | A1* | 7/2015 | Lombardi | G06F 3/00 348/207.99 |
| 2016/0323504 | A1* | 11/2016 | Ono | H04N 5/2259 |

FOREIGN PATENT DOCUMENTS

| | | | | |
|---|---|---|---|---|
| KR | 10-2015-0026387 A | 3/2015 | | |
| KR | 10-2015-0029049 A | 3/2015 | | |
| KR | 10-1534302 B1 | 7/2015 | | |
| KR | 101534302 | * | 7/2015 | ............. G04G 17/00 |
| KR | 10-1549109 B1 | 8/2015 | | |

* cited by examiner (a)

(b)

(a)

(b)

(a)

(b)

(a)    (b)

(a)

(b) (c)

(a)

(b)

(c)

(a)

(b)　　　　　　　　　(c)

SMART WATCH AND METHOD FOR CONTROLLING SAME

CROSS REFERENCE TO RELATED APPLICATIONS

This application is the National Phase of PCT International Application No. PCT/KR2016/000455, filed on Jan. 15, 2016, which claims priority under 35 U.S.C. 119(a) to Patent Application No. 10-2015-0168586, filed in the Republic of Korea on Nov. 30, 2015 and No. 10-2015-0168589, filed in the Republic of Korea on Nov. 30, 2015, all of which are hereby expressly incorporated by reference into the present application.

TECHNICAL FIELD

The present specification relates to a wearable smart device, and more particularly, to a smart watch capable of being worn on a wrist of a user and a method of controlling therefor.

BACKGROUND ART

Generally, terminals can be classified as mobile/portable terminals and stationary terminals according to their mobility. The mobile terminals can be further classified as handheld terminals and vehicle mount terminals according to possibility of user's direct portability.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs. In order to perform the aforementioned functions, basically, a mobile terminal is connected with different devices or a network using various communication protocols and may be able to provide ubiquitous computing environment to a user. In particular, the mobile terminal is evolving to a smart device enabling connectivity to a network and ubiquitous computing.

Conventionally, the smart device as the mobile terminal has been manufactured by a size capable of being held by a hand of a user and the user used to carry the smart device by hand or put in a bag or a pocket. Yet, with technological advances, the smart device is manufactured by a smaller size and is evolving to a wearable device directly worn on a body of a user. In particular, among wearable smart devices, a smart watch capable of being worn on a wrist of a user has been recently developed and is widely used.

The smart watch has been developed to provide not only a function of a general watch (e.g., time information) with a wearable small size but also various and enhanced functions as a mobile terminal. A recently developed smart watch has almost all functions of the previously mentioned mobile terminal to enable the mobile terminal to be replaced with the smart watch. Meanwhile, since a user is able to conveniently carry a smart device, the user frequently uses a camera of the smart device to obtain image information, i.e., to capture a picture and a video, preferred by the user. Yet, since it is necessary for the smart watch to have a size as small as being worn on a wrist, unlike general smart devices, it is difficult for the smart watch to have a camera. In order to enable a user to have image information using the smart watch, it is necessary to enhance the smart watch to have a camera. And, in order to more efficiently use the camera mounted on the smart watch, it is necessary to optimally control the smart watch in consideration of not only the camera but also the characteristic of the smart watch itself.

DISCLOSURE OF THE INVENTION

Technical Task

Accordingly, the present specification is directed to an apparatus and method thereof that substantially obviate one or more problems due to limitations and disadvantages of the related art. An object of the present specification is to provide a smart watch having more extended functionality.

Another object of the present specification is to provide a method of controlling a smart watch to efficiently use a camera mounted on the smart watch.

Technical Solution

To achieve these and other advantages and in accordance with the purpose of the present invention, as embodied and broadly described, according to one aspect, a smart watch includes a case, a display configured to be positioned at the case and display various information containing current time, a band configured to be connected to the case and wrap around a wrist of a user, and a camera configured to be provided to the band and capture an image, the camera configured to be movable to make the camera to be precisely oriented towards a subject.

The camera can be configured to move away from the case or move towards the case.

The band can be configured to move along a circumference direction of the wrist of the user together with the camera.

First of all, the band can be extended while penetrating the case to wrap around the wrist of the user. The smart watch further includes a sensor which is deployed to the case in a manner of being adjacent to the wrist of the user. The band can be configured not to be interfered with the sensor. More specifically, the band is extended in a length direction of the band and can include a slot at which the sensor is positioned. The band may pass between the sensor and the display in order not to be interfered with the sensor.

The case includes a first band and a second bar installed in a body of the case and the band can be configured to wind up the first bar, wrap around the wrist of the user, and wind up the second bar. The case includes a first bar installed in a body of the case, the band includes a third bar installed in a body of the band, and the band includes the camera and a first band consisting of a belt winding up the first bar and the third bar.

Meanwhile, the camera can be attached to the band in a detachable manner or can be configured to be clamped with the band. And, the camera can be slidably coupled with the band. The band is configured by a plurality of sections coupled each other in a detachable manner and a plurality of the sections can include a first section including the camera.

Preferably, if the camera moves or a distance between the case and the camera is changed, the camera can be configured to be activated. To this end, the smart watch can further include a sensor configured to sense a movement of the camera or a change of the distance between the case and the camera.

To further achieve these and other advantages and in accordance with the purpose of the present invention, according to a different aspect, a method of controlling a smart watch including a case, a band configured to be connected to the case and wrap around a wrist of a user, and a camera configured to be provided to the band and movable, includes the steps of sensing a movement of the camera, if the camera moves, activating the camera to obtain an image, receiving an indication for performing an operation related to the obtained image, and performing the indicated operation.

The sensing step can include the step of sensing a change of a distance between the case and the camera. The sensed movement can include a movement that moves the band along a circumference direction of the wrist of the user together with the camera. On the other hand, the sensed movement can include a movement that arranges the camera to a different position of the band from a point of the band.

If an indication is not received from the user during prescribed time after the camera is activated, the method can further include the step of deactivating the camera.

Meanwhile, the receiving step and the performing step can include the steps of, if the camera obtains an image of a person, automatically focusing on the person in the camera and capturing a picture of the person according to manipulation of a prescribed user. And, the capturing step can include the steps of arranging the person to the center of the image before the picture of the person is captured and/or adjusting an image to be captured according to a prescribed condition.

On the other hand, the receiving step and the performing step can include the steps of, if the camera obtains an image of an object or a person, searching for information on the object or the person according to manipulation of a prescribed user, and providing the searched information to the user.

On the other hand, if the camera obtains an image of an object or a person, the receiving step and the performing step can include the step of applying the image to a face of the smart watch according to manipulation of a prescribed user.

On the other hand, the receiving step and the performing step can include the steps of, if the camera obtains an image of a bar code, automatically recognizing the bar code, and displaying information associated with the bar code on a display. If the information associated with the bar code corresponds to information on a product, the method can further include the step of additionally providing information for purchasing the product.

Advantageous Effects

According to the present specification, a smart watch can include a camera installed in a band of the smart watch. Hence, the smart watch can autonomously obtain images despite of a small size of the smart watch. As a result, functionality of the smart watch can be practically extended. And, the camera can be configured to move along the band for precise orientation. Hence, a position of the camera can be controlled to make the camera to be precisely oriented towards a subject due to the movement of the camera. Hence, an image of a preferred subject can be efficiently and conveniently obtained. Moreover, the camera can be automatically activated by the movement of the camera. Hence, a user can use the smart watch more conveniently and efficiently.

Meanwhile, a control method of a smart watch according to the present specification can provide an optimized operation and a function according to the optimized operation using a structural characteristic of a camera mounted on the smart watch. Hence, the control method of the present specification can more enhance convenience and efficiency in using the smart watch.

Further scope of applicability of the present specification will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BEST MODE FOR INVENTION

Figure 1:
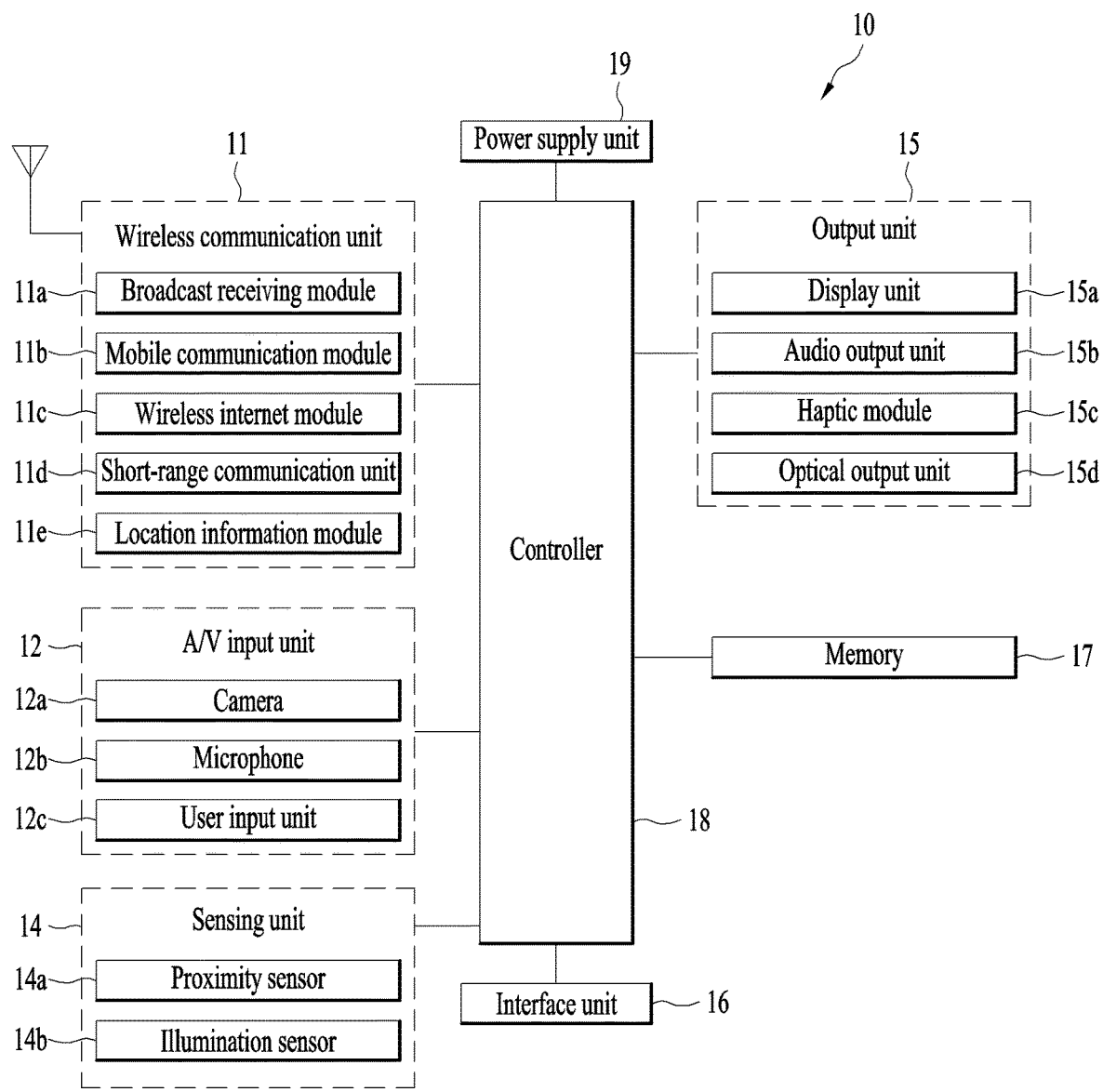
FIG. 1 is a block diagram for a configuration of a smart watch related to the present specification.

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a term such as "module" and "unit" may be used to refer to elements or components. Use of such a term herein is merely intended to facilitate description of the specification, and the term itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first (1st), second (2nd), etc. may be used herein to describe various elements, these elements should not be limited by these terms. These terms are generally only used to distinguish one element from another.

It will be understood that when an element is referred to as being "connected with" another element, the element can be directly connected with the other element or intervening elements may also be present. In contrast, when an element is referred to as being "directly connected with" another element, there are no intervening elements present.

A singular representation may include a plural representation unless it represents a definitely different meaning from the context.

Terms such as "comprise", "include" or "have" are used herein and should be understood that they are intended to indicate an existence of several components, functions or steps, disclosed in the specification, and it is also understood that greater or fewer components, functions, or steps may likewise be utilized. Moreover, due to the same reasons, it is also understood that the present application includes a combination of features, numerals, steps, operations, components, parts and the like partially omitted from the related or involved features, numerals, steps, operations, components and parts described using the aforementioned terms unless deviating from the intentions of the disclosed original invention.

Smart devices presented herein may be implemented using a variety of different types of terminals. Examples of such terminals include cellular phones, smart phones, laptop computers, digital broadcast terminals, personal digital assistants (PDAs), portable multimedia players (PMPs), navigators, slate PCs, tablet PCs, ultrabooks, wearable devices (for example, smart watches, smart glasses, head mounted displays (HMDs)), and the like.

By way of non-limiting example only, further description will be made with reference to particular types of smart devices. However, such teachings apply equally to other types of smart devices, such as those types noted above.

FIG. 1 is a block diagram to describe a smart watch related to the present application. A general configuration of the smart watch is described with reference to FIG. 1 as follows.

First of all, the smart watch 100 may include components such as a wireless communication unit 11, an input unit 12, a sensing unit 14, an output unit 15, an interface unit 16, a memory 17, a controller 18, a power supply unit 19, and the like. It is appreciated that implementing all of the components shown in FIG. 1 is not a requirement, and that greater or fewer components may alternatively be implemented. Moreover, the real shapes and structures of the aforementioned components are not illustrated all but the shapes and structures of some significant components are shown in the drawings following FIG. 1. Yet, it is apparent to those skilled in the art that components described without being illustrated can be included in the smart watch to embody the functions of a smart device.

In particular, among the above-listed components, the wireless communication unit 11 typically includes one or more modules which permit communications such as wireless communications between the smart watch 100 and a wireless communication system, communications between the smart watch 100 and another smart watch, communications between the smart watch 100 and an external server. Further, the wireless communication unit 11 typically includes one or more modules which connect the smart watch 100 to one or more networks.

To facilitate such communications, the wireless communication unit 11 may include one or more of a broadcast receiving module 11a, a mobile communication module 11b, a wireless Internet module 11c, a short-range communication module 11d, and a location information module 11e.

The input unit 12 includes a camera 12a (or an image input unit) for an image or video signal input, a microphone 12b (or an audio input unit) for an audio signal input, and a user input unit 12c (e.g., a touch key, a push key, etc.) for receiving an input of information from a user. Audio or image data collected by the input unit 12c may be analyzed and processed into user's control command.

The sensing unit 14 is typically implemented using one or more sensors configured to sense internal information of the smart watch, the surrounding environment of the smart watch, user information, and the like. For example, the sensing unit 14 may include a proximity sensor 14a and an illumination sensor 14b. If desired, the sensing unit 14 may alternatively or additionally include other types of sensors or devices, such as a touch sensor, an acceleration sensor, a magnetic sensor, a gravity sensor (G-sensor), a gyroscope sensor, a motion sensor, an RGB sensor, an infrared (IR) sensor, a finger scan sensor, a ultrasonic sensor, an optical sensor (for example, the camera 12a), the microphone 12b, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The smart watch 100 disclosed in the present specification may be configured to utilize information obtained from the sensing unit 14, and in particular, information obtained from one or more sensors of the sensing unit 140, and combinations thereof.

The output unit 15 is typically configured to output various types of information, such as audio, video, tactile output, and the like. The output unit 15 may include a display unit 15a, an audio output unit 15b, a haptic module 15c, and an optical output module 15d. The display unit 15a may have an inter-layered structure or an integrated structure with a touch sensor in order to facilitate a touchscreen. The touchscreen may provide an output interface between the smart watch 100 and a user, as well as function as the user input unit 12c which provides an input interface between the smart watch 100 and the user.

The interface unit 16 serves as an interface with various types of external devices that can be coupled to the smart watch 100. The interface unit 16, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the smart watch 100 may perform assorted control functions associated with a connected external device, in response to the external device being connected to the interface unit 16.

The memory 17 is typically implemented to store data to support various functions or features of the smart watch 100. For instance, the memory 170 may be configured to store application programs (or applications) run in the smart watch 100, data or instructions for operations of the smart watch 100, and the like. Some of these application programs may be downloaded from an external server via wireless communication. Other application programs may be installed on the smart watch 100 at time of manufacturing or shipping, which is typically the case for basic functions of the smart watch 100 (for example, receiving a call, placing a call, receiving a message, sending a message, and the like). It is common for application programs to be stored in the memory 17, installed on the smart watch 100, and launched by the controller 18 to perform operations (or functions) for the smart watch 100.

The controller 18 typically functions to control overall operations of the smart watch 100, in addition to the operations associated with the application programs. The controller 18 may provide or process information or functions appropriate for a user by processing signals, data, information and the like, which are inputted or outputted by the various components depicted in the above description, or running application programs stored in the memory 17.

Moreover, in order to launch an application program stored in the memory 17, the controller 18 can control at least one portion of the components described with reference to FIG. 1. Furthermore, the controller 18 controls at least two of the components included in the smart watch 100 to be activated in combination to launch the application program.

The power supply unit 19 can be configured to receive external power or provide internal power in order to supply appropriate power required for operating elements and components included in the smart watch 100. The power supply unit 19 may include a battery 19a. In particular, the battery 19a may include at least one of a built-in battery or a replaceable (or detachable) battery.

At least a part of the configuration elements can cooperate with each other to implement an operation, a control and a method of controlling a smart watch 100 according to various embodiments described in the following. The operation, the control and the method of controlling the smart watch 100 can be implemented in the smart watch 100 in a manner of driving at least one or more application programs stored in the memory 17.

The smart watch 100 is depicted as a device including a type, i.e., a traditional watch type, capable of being worn on a body, i.e., a wrist of a user in the following drawings, by which the present invention may be non-limited. The present invention can also be applied to various structures including a necklace type, and the like. In particular, a configuration of a specific type of the smart watch 100 and explanation on the configuration can be generally applied not only to the specific type of the smart watch 100 but also to a smart watch 10 of a different type.

Figure 2:
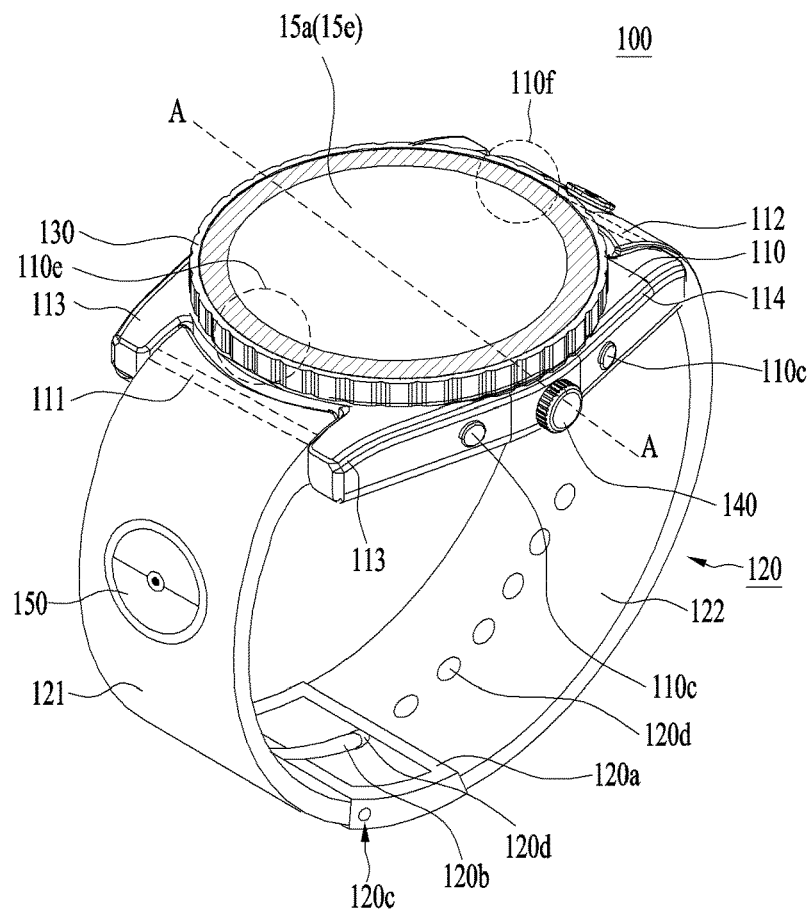
FIG. 2 is a perspective diagram for a smart watch according to the present specification.
Figure 3:
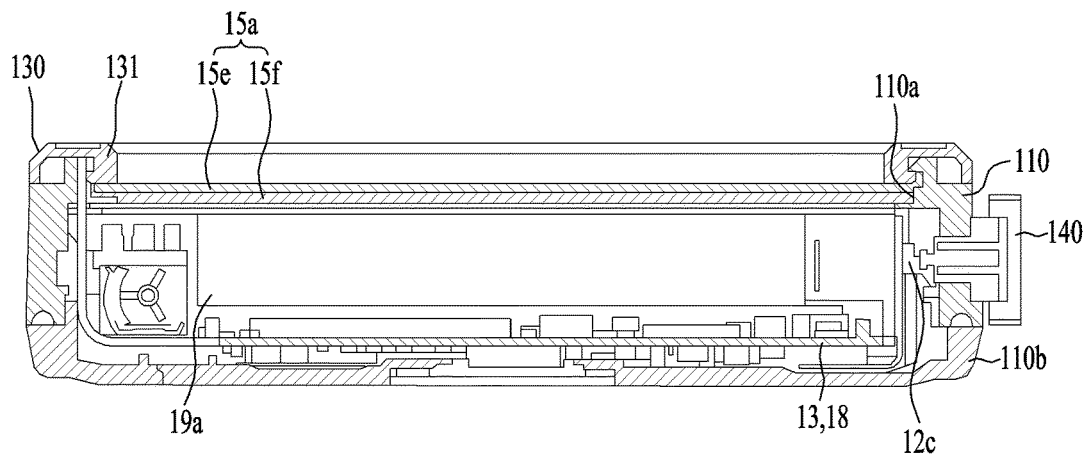
FIG. 3 is a cross section diagram for a smart watch obtained according to A-A line shown in FIG. 2.

A general configuration of the aforementioned smart watch 100 is explained first and then a structure of the smart watch 100 is explained with reference to a related drawing. Regarding this, FIG. 2 is a perspective diagram for a smart watch according to the present specification and FIG. 3 is a cross section diagram for a smart watch obtained according to A-A line shown in FIG. 2.

A smart watch 100 can include a case 110 that practically forms a body of the smart watch 100. As well shown in FIG. 3, the case 110 can form an internal space of a prescribed size to accommodate various parts. The case 110 may have an opening 110a communicating with the internal space to install the parts in the internal space. The case 110 can be made of one member. Yet, as shown in the drawing, the case 100 may have a detachable case back 110b capable of being combined with the case. In particular, it is able to easily approach to internal parts in the case via the detachable case back 110b. In general, the case 110 has a circle shape. Yet, the case 100 may have various forms including a square shape.

The smart watch can also include a band 120 connected with the case 110. The band 120 can be configured to make a body, i.e., the smart watch 100, to be worn on a wrist. Since the band 120 is made of a flexible material, the band 120 wraps around the wrist in a manner of being worn on the wrist and can be deformed according to appearance of the wrist. For example, the band 120 can be made of various materials such as leather, rubber, silicon, synthetic resins, and the like. And, since the band 120 is configured to be detachable from the case 110, a user can change various types of band according to the preference of the user. Meanwhile, the band 120 can be used for extending performance of an antenna of a wireless communication unit 11 (refer to FIG. 1). For example, a ground extension unit (not depicted) for extending a ground region can be included in the band 120 in a manner of being connected with an antenna.

The band 120 may have various structures. FIG. 2 illustrates the most basic structure of the band 120. As mentioned in the foregoing description, in order to make the smart watch 100 to be worn on a wrist of a user having a curvature, the band 120 can wrap around the wrist of the user in a manner of being deformed. If the smart watch is worn on the wrist, the case 110 and the band 120 connected with each other, i.e., the smart watch 100, may have a shape of a closed loop or a ring wrapping around the wrist of the user. In order to wear or take off the smart watch 100 on/from the wrist of the user, it is necessary to open the smart watch 100. In particular, it is necessary to make the smart watch 100 of a closed ring shape to be partly disconnected. The wrist of the user is inserted into the smart watch 100, i.e., an opened loop formed by the smart watch 100, through a gap (clearance) formed by the disconnection and then the smart watch can wrap around the wrist of the user. And, the user withdraws the wrist of the user from the smart watch 100 through the gap to separate the smart watch 100 from the wrist. Yet, since the case 110 is solidly formed to protect parts of the smart watch 100, it is necessary to selectively disconnect or connect the band 120 to form the gap instead of the case 110. In particular, as shown in FIG. 2, the band 120 can include a first band 121 and a second band 122 configured to be selectively disconnected and connected. The first and the second bands 121/122 can be connected to any position of the case 110. In this case, when the first and the second bands 121/122 wrap a wrist of a user, it is more advantageous that the first and the second bands are connected to a side of the case 110. For the same reason, the first and the second bands 121/122 can be arranged while facing each other. More specifically, for the facing arrangement, the first band 121 is deployed to 6 o'clock direction or a bottom part of the smart watch 100 or the case 110, whereas the second band 122 is deployed to 12 o'clock direction or a top part of the smart watch 100 or the case 110. In particular, the first band 121 can be connected to a first point 110e of the case 110 and the second band 122 can be connected to a second point 110f of the case 110. In this case, the first point 110e may become a point corresponding to 6 o'clock direction (or a bottom part) of a side of the case 110 and the second point 110f may become a point corresponding to 12 o'clock direction (or a top part) of a side of the case 110.

The first and the second bands 121/122 can be connected to the case 110 using various methods. Among the various methods, it may use a bar to connect the bands 121/122 with the case 110. Practically, the bar can be configured by a spring bar. The spring bar can include a hollow body including a spring and pins inserted into both ends of the body in a manner of being supported by the spring. If the pins are pressed while being supported by the spring, a length of the spring bar can be reduced. If force applied to the pins is released, the spring bar may have an original length. In particular, the bar can be easily coupled and decoupled with/from the case 100 together with the bands 121/122. More specifically, the case 110 can include a first bar 111 installed in the first point 110e and a second bar 112 installed in the second point 110f. In order to stably install the first bar 111 and the second bar 112, the case 110 can include a first lug 113 and a second lug 114. The first lug 113 is arranged in a manner of being adjacent to the first point 110e and can be configured by a pair of protrusions separated from each other with a prescribed space. Similarly, the second lug 114 is arranged in a manner of being adjacent to the second point 110f and can be configured by a pair of protrusions separated from each other with a prescribed space. The first lug 113 and the second lug 114 can include a hole or a recess capable of accommodating pins arranged to both ends of the first bar 111 and the second bar 112. First of all, the first bar 111 and the second bar 112 can be inserted into an end of the first band 121 and the second band 122, respectively. If the pins exposed from the first bar 111 and the second bar 122 are inserted into the holes of the first lug 113 and the second lug 114, respectively, the first bar 111 and the second bar 112 can be connected to the first lug 113 and the second lug 114, respectively, together with the first band 121 and the second band 122. As mentioned in the foregoing description, when the first bar 111 and the second bar 112 are respectively installed in the first lug 113 and the second lug 114, length of the bars are reduced by pressing the pins installed in both ends of the bars. When the first bar 111 and the second bar 112 are aligned with the holes of the first lug 113 and the second lug 114, if force applied to the first bar 111 and the second bar 112 are released, the lengths of the bars are increased and the bars can be inserted to the holes. Hence, the first band 121 and the second band 122 can be stably connected to the first point 110e and the second point 110f of the case 110.

Figure 4:
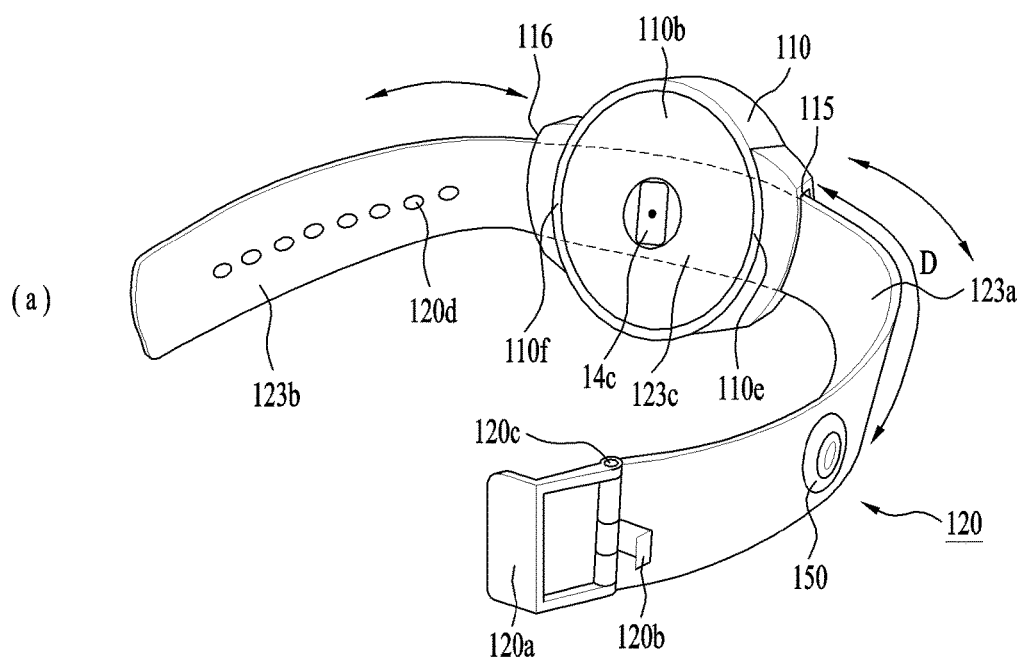
FIG. 4 is a perspective diagram for an example of a band which is configured to be movable along a circumference direction of a wrist of a user.
Figure 4:
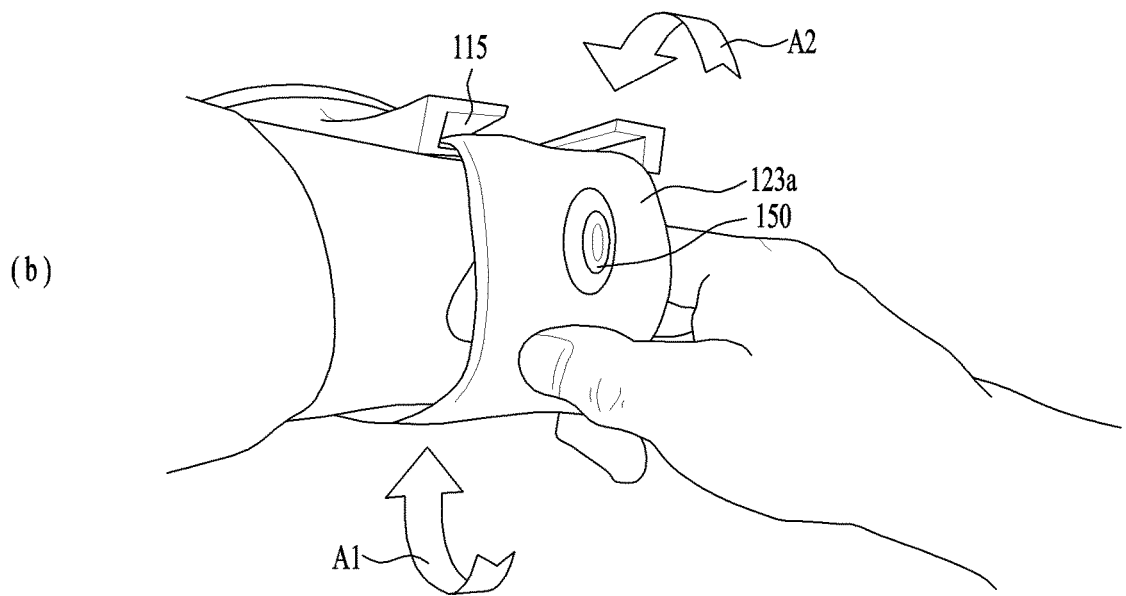

In order to take off the smart watch 100, it is necessary to decouple the first band 121 from the second band 122. In order to wear the smart watch 100, it is necessary to couple the first band 121 with the second band 122 again. For the selective decoupling and coupling, the band 120 can include a fastener. The fastener can be implemented by a buckle, a hook structure of which snap-fit is available, or Velcro (brand name). The fastener can include a section or a material which is elastic. FIG. 2 illustrates an example that the fastener is implemented in a buckle form. More specifically, the band 120 can include a buckle 120a as a fastener and a pin 120b coupled with the buckle 120a. As shown in FIG. 4, the buckle 120a and the pin 120b can be installed in either the first band 121 or the second band 122. FIG. 2 illustrates the buckle 120a and the pin 120b installed in the first band 121. Similar to the case of connecting the case 110 with the band 120, the buckle 120a and the pin 120b can be connected to the band 120 using a bar. More specifically, a third bar 120c is installed in an end that faces another end of the first band 121 connected to the case 110. And, the buckle 120a and the pin 120b can be coupled with the third bar 120c. And, a plurality of adjustment holes 120d can be formed on a band different from the band in which the buckle 120a and the pin 120b are installed, i.e., the second band 122. In particular, the circumference of the smart watch 100 can be adjusted to a wrist of a user by coupling the buckle 120a and the pin 120b with one of a plurality of the holes 120d.

The smart watch 100 can include a bezel 130 located on the case 110. The bezel 130 is made of a member of a ring shape and can be extended along an edge of the case 110. More specifically, the bezel 130 can be configured to wrap around the opening 110a of the case 110. In particular, as mentioned below, the bezel 130 wraps around a display unit 15a deployed to the opening 110a to protect the display unit. Moreover, the bezel 130 may hold separate glass or crystal member protecting the display unit 15a or may hold the display unit 15a itself. The bezel 130 can be configured to provide not only the protection purpose but also different functions. Or, the bezel can be used for a decorative purpose as well.

The smart watch may also have a crown 140 deployed to a side of the case 110. In case of a general analog watch, the crown 140 is connected to the movement installed in the case 110 in a rotatable manner. It is able to move physical hands by rotating the crown 140. In particular, in the general watch, the crown 140 is used to adjust hands to correct a time error. Similarly, in case of the smart watch 100, the crown 140 can also be used to adjust virtual hands displayed on the display unit 15a to show accurate time. Moreover, in the smart watch 100, the crown 140 can be configured as an input unit 12c. More specifically, it may be able to forward a prescribed control signal to the controller 18 by rotating the crown 140 and it may indicate a prescribed operation to the smart watch 100 according to the control signal. For example, a user can scroll a list displayed on the display unit 15a according to the rotation of the crown 140. Or, the user may expand or reduce a specific object according to the rotation of the crown 140. And, the crown 140 can be configured to push a switch connected with a board 13, the input unit 12c, and indicate an operation. In order to configure a more extended input unit 12c, the smart watch 100 can include a push button 110c. As shown in FIG. 2, the push button 110c can be deployed to a side of the case 110 in a manner of being adjacent to the crown 140. For example, the push button 110c can be connected with a switch which is installed in the board 13 or the switch electrically connected with the board 13. In particular, if the push button 110c is pushed, an electrical signal can be transmitted to the board 13 and the controller 18. Hence, it may be able to indicate corresponding electronic components to operate as a mobile terminal.

As mentioned in the foregoing description, the case 110 can be basically configured to support various electrical and mechanical components required for operations of the smart watch 100 in the functional aspect. FIG. 3 well illustrates the internal of the smart watch. Internal components of the smart watch are explained in detail in the following with reference to FIG. 3.

The smart watch 100 can include a display unit 15a as an output unit 15. The display unit 15a can be exposed from the smart watch 100 to make the display unit to be well seen to a user in a state of being worn on the user. Basically, the display unit 15a is arranged to the inside of the case 110 and can be exposed to the user via an opening 110a of the case 100. In particular, the display unit 15a and the case 110 may form the exterior of the smart watch 100. The display unit 15a can provide various informations to the user as a function of a mobile terminal or a smart device. More specifically, the display unit 15a can display various informations processed in the smart watch 100. For example, the display unit 15a basically outputs various images and text information and can display execution screen information of an application program executed in the smart watch 100 or UI (user interface) and GUI (graphic user interface) according to the execution screen information. Moreover, the display unit 15a can inform a user of current time. In order to display the current time, the display unit 15a may directly display a number corresponding to the current time. Or, the display unit may display a dial (or, face) and hands like an analog watch does. In particular, the display unit 15a and other electronic components related to the display unit can implement an electrical and virtual watch in the smart watch.

The display unit 15a can include at least one selected from the group consisting of an LCD (liquid crystal display), a TFT LCD (thin film transistor-liquid crystal display), an OLED (organic light-emitting diode), a flexible display, a 3D display, and an e-ink display. The display unit 15a can include a display module 15f and a window 15e covering the display module 15f. The display module 15f can be made of such a display element as the LCD, the OLED, or the like. The display module 15f corresponds to a configuration element that practically displays picture information. The window 15f can be deployed to a part where the display module 15f is exposed to a user and can protect the display module 15f from the external. In particular, the window 15e may function as a glass or crystal member of a normal watch. In addition to the protection function, it is necessary for the window to make information displayed on the display module 15f to be seen to a user. Hence, the window 15e can be made of a material of appropriate solidity and transparency. As well shown in FIG. 3, the display module 15f can be directly attached to a rear side of the window 15e. In this case, as shown in the drawing, the bezel 130 and the case 110 can be configured to hold both the window 15e and the display module 15f. The display module 15f can be directly attached to the window 15e in various ways. An adhesive can be most conveniently used for the direct attachment.

The display unit 15a can include a touch sensor configured to sense a touch touched on the display unit 15a to receive a control command input inputted by a touch scheme. The touch sensor can use at least one selected from the group consisting of a resistive type, a capacitive type, an infrared type, an ultrasonic type, a magnetic field type, and the like. For example, according to the resistive type and the capacitive type, a touch sensor can be configured to convert a pressure applied to a specific part of a touch screen or a change of capacity generated at a specific part into an electrical input signal. If a touch is inputted on the display unit 15a, the touch sensor senses the touch and the controller 18 can generate a control command corresponding to the touch based on the sensed touch. Content inputted by the touch scheme may correspond to a text, a number, or a menu item capable of being indicated or designated in various modes.

Meanwhile, the touch sensor is configured by a film form including a touch pattern and can be arranged between the window 15e and the display module 15f. Or, the touch sensor may correspond to a metal wire directly patterned on the rear side of the window 15e. Or, the touch sensor can be integrated with the display module 15f. For instance, the touch sensor may be arranged on a board of the display module 15f or can be installed in the inside of the display module 15f. As mentioned in the foregoing description, the display unit 15a can form a touch screen together with the touch sensor. In this case, the touch screen may function as the user input unit 12c (refer to FIG. 1). In some cases, a physical key (e.g., a push key) can be additionally provided to a position adjacent to the display unit 15a, which is a touch screen, for a convenient input of a user as the user input unit 12c.

The smart watch 100 can include a board 13 installed in the inside of the case 110. The board 13 corresponds to a configuration element in which various electronic components are installed together with a different circuit and elements assisted by the controller 18. The controller 18 can be configured by a microprocessor. The microprocessor corresponds to an assembly of circuits that control the smart watch 100. The microprocessor can include a plurality of sub circuit assemblies (i.e., a plurality of modules) structurally and functionally distinguished from each other according to a controlled operation. Each of the configuration elements 11 to 19 depicted in FIG. 1 can be directly installed in the board 13 to be controlled by the controller 18 or can be electronically connected with the board 13 in a manner of being installed in the inside of the case 110. Hence, the controller 18 installed in the board 13 is electronically connected with all of the configuration elements and can control the configuration elements. Hence, the controller 18 can be referred to as various names such as a controller, a controlling device, and the like. The controller 18 can control all configuration elements of the smart watch 100. The configuration elements controlled by the controller include not only the configuration elements shown in FIGS. 1 to 3 but also other configuration elements to be described later. Hence, the controller 18 may become an practical configuration element that appropriately performs a control method of the present specification described in the following by controlling operation of other configuration elements. For this reason, all detail steps performed in the control method of the present specification may become the characteristics of the controller 18.

Moreover, the smart watch 100 can include a battery 19a (refer to FIG. 1) as a power supply unit 19 for supplying power. The battery 19a may be configured to be fixed in the case 110 or may be configured to be detachable from the case 110. The battery 19a can be charged via a power cable connected to the smart watch 100. And, the battery 19a can be configured to be charged in wireless via a wireless charger. The wireless charging can be implemented by a magnetic induction scheme or a resonance scheme (magnetic resonance scheme).

As mentioned in the foregoing description, a user more frequently uses a camera in a smart device or a mobile terminal, whereas it is difficult to include a camera in the smart watch 100 due to a small size of the smart watch 100. In particular, since the display unit 15a occupies the most part of a body (i.e., the case 110) of the smart device 100, it is difficult to secure a structure for exposing a lens of the camera to the external. On the other hand, unlike the case 110, since the band 120 is exposed to the external, various components can be attached to the band. For this reason, the smart watch 100 can include a camera 150 provided to the band 120. The camera 150 can be deployed to any position of the band 120. For example, although FIG. 2 illustrates a case that the camera 150 is deployed to the first band 121, the camera 150 can also be deployed to the second band 122. If necessary, the cameras 150 can be deployed to both the first band 121 and the second band 122.

The camera 150 can be configured by a digital camera and can be provided to the band 120 as an independent and compact module. Unlike a normal camera that prints an image for a subject on a film, a digital camera module can be basically configured to obtain image information on an external subject using electronic elements. The image information can include a digital still image (i.e., a picture) and a moving image (i.e., a video). In the following description of the present specification, for clarity, the image information is simply represented by an image. Yet, the image should be construed as information including not only the still image (picture) but also the moving image (video).

More specifically, an image captured by the camera 150 can be captured by interaction between a lens and an image sensor. The lens can focus a light reflected from a subject on a spot. Hence, a sensor having a relatively small size can change optical information of the subject included in the focused spot into an electrical signal. A captured image can be delivered to relevant components included in the case 110 (e.g., the controller 18 and the memory 17) in wired or in wireless. For example, the camera 150 can include one of wireless communication modules mentioned earlier in the wireless communication unit 11 shown in FIG. 1 and can transmit an image obtained in wireless using the module to the body (i.e., the case 110) of the smart watch 100. In particular, the obtained image is firstly transmitted to the wireless communication module included in the case 110 and then the image can be transmitted to the controller 18 and other related components. Meanwhile, the camera 150 can be directly connected to the board 13 and related components included in the case 110 via a wire or a FPCB (flexible printed circuit board) embedded in the band 120 to transmit the obtained image. The smart watch 100 can autonomously capture an image despite of the small size of the smart watch with the help of the camera 150. Hence, functionality of the smart watch 100 can be extended.

Meanwhile, since a smart device is held by a hand of a user in general, orientation of the smart device can be easily changed. However, since a smart watch 100 is worn on a wrist of a user, there may be a restriction on a change of orientation of the smart watch. Hence, it may be difficult to make a camera 150 to be precisely oriented towards a subject in the smart watch 100. For this reason, it may be able to configure the camera 150 to be movable to make the camera to be precisely oriented towards a subject. Since the camera 150 is basically provided to a band 120, the camera 150 can be configured to move along the band 120 for the precise orientation. Since the band 120 is connected to a case 110, the camera 150 can move towards the case 110 or moves backwards from the case 110 while moving along the band 120. Thus, a position of the camera 150 can be adjusted to make the camera to be precisely oriented towards a subject with the help of the movement of the camera. And, it is able to efficiently and conveniently capture an image of a preferred subject.

Figure 5:
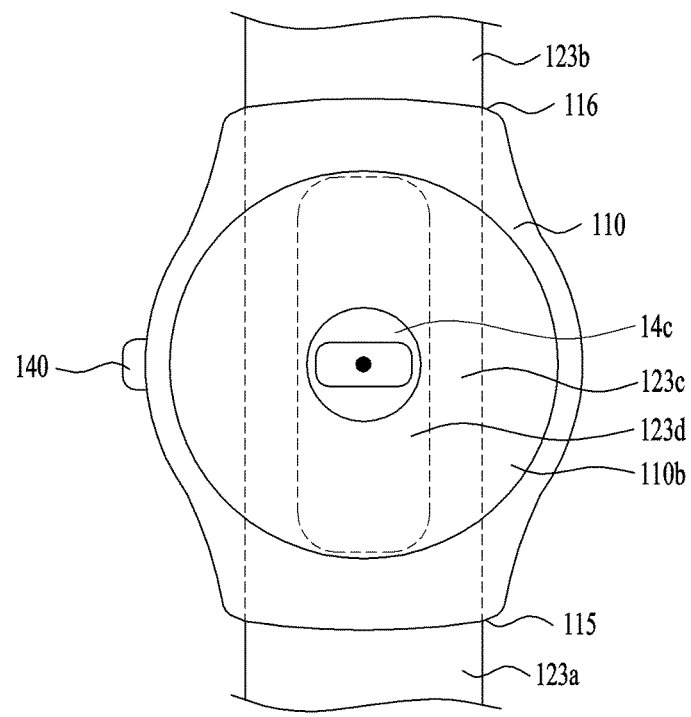
FIG. 5 is a real view illustrating a band shown in FIG. 4 and an example of arranging the band.
Figure 6:
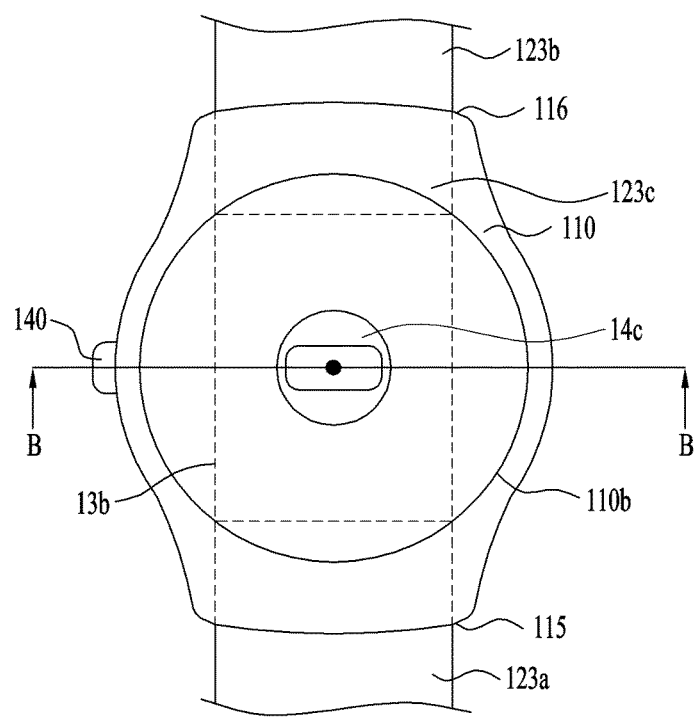
FIG. 6 is a real view illustrating a band shown in FIG. 4 and a different example of arranging the band.
Figure 7:
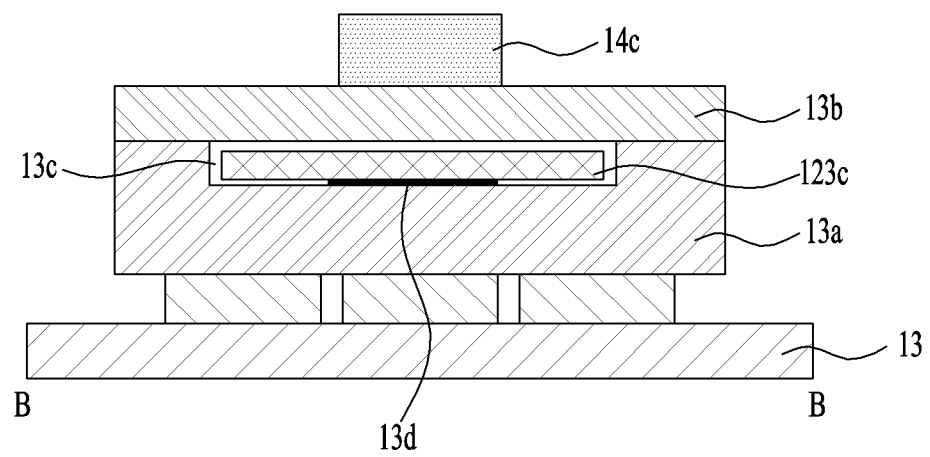
FIG. 7 is a cross section diagram obtained according to B-B line shown in FIG. 6.

The movement of the camera 150 can be performed using various methods. Among the methods, first of all, it may be able to configure the band 120 to be movable instead of the camera 150. Since the camera 150 is provided to the band 120, if the band 120 moves, the camera 150 can move as well. The band 120 wraps around a wrist of a user while being extended along a circumference direction of the wrist. In particular, when the smart watch 100 is worn on the wrist of the user, the band 120 can practically move along the circumference direction of the wrist of the user and the camera 150 can also move along the circumference direction together with the band 120 to adjust orientation. The camera 150, which moves according to the movement of the band 120, is explained in more detail in the following with reference to a related drawing. FIG. 4 is a perspective diagram for an example of a band which is configured to be movable along a circumference direction of a wrist of a user. FIG. 5 is a real view illustrating a band shown in FIG. 4 and an example of arranging the band. FIG. 6 is a real view illustrating a band shown in FIG. 4 and a different example of arranging the band. FIG. 7 is a cross section diagram obtained according to B-B line shown in FIG. 6. Since FIG. 2 shows an overall structure of the smart watch 100, following description basically refers to FIG. 2 unless there is a drawing to be specially referred.

Unlike the band 120 that the first band 121 and the second band 122 separated from each other are respectively connected to the case 110, a band 120 shown in FIG. 4(a) can be configured by a single piece, i.e., a single strap. The band 120 can be extended in a manner of penetrating the case 110 to wrap around a wrist of a user. More specifically, the band 120 may enter a point (e.g., a first point 110e) of the case 110 in a manner of being extended. Subsequently, the band 120 is able to come out through another point (e.g., a second point 110O of the case 110 by penetrating the case 110. In particular, both ends of the band 120, which has penetrated the case 110, can be coupled with each other or decoupled from each other using the aforementioned fastener mechanism 120a to 120d to wear or take off the smart watch 100 on/from a user. And, in order to make the band 120 penetrate the case 110, a first slot 115 and a second slot 116 can be respectively formed at a first point 110e and a second point 110f of the case 110 instead of the aforementioned bars and the lugs 111 to 114. In particular, the band 120 enters the inside of the case 110 through the first slot 115 and can come out from the case 110 through the second slot 116. The band 120 can include a first section 123a and a second section 123b exposed from the case 110, more precisely, from the first point 1102 and the second point 110f or the first slot 115 and the second slot 116, and a third section 123c arranged at the inside of the case 110.

Due to the abovementioned installation structure, the band 120 is not bound by the case 110. Hence, the band 120 can freely move through the case 110. In particular, the band 120 can be slidably coupled with the case 110 and can be slid in the case 110. In particular, as shown in FIG. 4(a), if a user moves the first section 123a or the second section 123b exposed to the external, the whole of the band 120 can move in a circumference direction along a wrist of the user together with the camera 150. More specifically, as shown in FIG. 4(b), if a user pulls the first section 123a down, the whole of the band 120 can move along an arrow (A1)

direction. As a result, the camera 150 mounted on the band 120 can also move away from the case 100 along the arrow (A1) direction. On the contrary, if the user pushes the first section 123a up, the whole of the band 120 can move along an arrow (A2) direction and the camera can move towards the case 110. In particular, the orientation of the camera 150 can be adjusted by moving the band 120 and the camera 150 and the camera 150 can precisely face a subject. Hence, a user can conveniently and efficiently capture an image using the smart watch 100. In the foregoing description, although the example of FIG. 4 has been explained based on the movement of the first section 123a, a movement of the second section 123b may bring the same result. And, when the band 120 moves, since it is necessary for the camera 150 to move together with the moving band 120 only, it is not mandatory for the camera 150 to be fixed on the band 120. In particular, in the example of FIG. 4, the camera 150 can be configured to be fixed or separated to/from the band 120. The configuration of the camera 150 can be identically applied not only to the example of FIG. 4 but also to examples of FIGS. 8 and 9 using a movement of the band 120.

As mentioned in the foregoing description, the smart watch 100 may have capability capable of performing various functions despite of the small size of the smart watch. For example, the smart watch 100 measures various information on surrounding environment of the smart watch 100 and can provide an additional function to a user based on the measured information. More specifically, since interest in health is increasing recently, the smart watch 100 is evolving to measure various body information and check and manage health status of a user based on the measured information. In particular, since the smart watch 100 is directly worn on a body of a user, it is very advantageous for the smart watch to measure body information. For this reason, as shown in FIG. 4 (a) and other drawings, the smart watch can include a sensor 14c configured to measure body information. For example, the sensor 14c can be configured by a PPG sensor configured to sense a photo-plethysmography (hereinafter, PPG) signal. The PPG signal corresponds to a signal indicating a pulsation component which is generated according to a heartbeat, i.e., a change of blood volume in a blood vessel. The smart watch 100 senses the PPG signal using the sensor 14c to measure a pulse, respiration, and oxygen saturation.

The sensor 14c radiates a light of a specific wavelength range to a body and measures a PPG signal using a light reflected from the body. The sensor 14c can be deployed to the case 110 in a manner of being adjacent to a wrist of a user using the abovementioned sensing mechanism. More specifically, the sensor 14c can be installed in a case back 110b capable of being directly contacted with a wrist of a user. In order to directly radiate a light to skin of a user and receive a reflected light, the sensor 14c can be exposed to the external from the case 110, i.e., the case back 110b. More specifically, the sensor 14c can include a front portion configured to radiate and receive a light. As shown in the drawing, the front portion can be exposed from a part of the case 110, i.e., the case back 110b, adjacent to a wrist of a user. Meanwhile, since the band 120 penetrates the case 110, a part of the band 120, i.e., the third section 123c positioned at the inside of the case 110, may interrupt the operation of the sensor 14c. For example, the third section 123c of the band 120 may block a light radiated from the sensor 14c. In order to make the sensor 14c smoothly operate, the band 120 can be configured not to interfere the sensor 14c.

More specifically, as shown in FIG. 5, the third section 123c of the band 120 may pass between the case 110 (specifically, the case back 110b) and the sensor 14c. In this case, since the band 120 (i.e., the third section 123c) blocks the sensor 14c, the sensor is unable to radiate a light to a user. Hence, the band 120 (i.e., the third section 123c of the band) can include a slot 123d of a prescribed size. The slot 123d can be formed in a manner of being aligned with the sensor 14c. In particular, the slot 123d can be formed on a partial region of the band 120 corresponding to a position of the sensor 14c. As shown in FIG. 5, the sensor 14c is deployed to the inside of the slot 123d and can communicate with the external of the case 110 via the slot 123d. Since the band 120 and the camera 150 move together, the slot 123d can be extended according to a moving direction of the band 120, i.e., a length direction of the band 120. In particular, although the band 120 moves, the sensor 14c can always communicate with the external via the slot 123d. The sensor 14c can operate without any interruption with the help of the slot 123d.

Alternatively, as shown in FIGS. 6 and 7, the band 120, i.e., the third section 123c, can be deployed to directly face a rear portion facing the front portion instead of the front portion of the sensor 14c configured to radiate and receive a light. In particular, the band 120 can pass between the display unit 15a (refer to FIG. 2), which is deployed to a location farthest from a wrist of a user, and the sensor 14c rather than between the case back 110b and the sensor 14c. According to the deployment shown in FIG. 6, since the band 120, i.e., the third section 123c, does not block the sensor 14c and the wrist of the user, the third section does not interrupt radiation and reception of a light of the sensor 14c. More specifically, as shown in FIG. 7, a spacer 13a of a prescribed size can be deployed between the board 13 and the sensor 14c. The spacer 13a can support an auxiliary board 13b connected with the board 13 and the sensor 14c can be installed in the auxiliary board 13b. And, the spacer 13a can include a channel 13c and the band, i.e., the third section 123c, can penetrate the channel 13c. The band 120 is stably supported in the case 110 with the help of the abovementioned supporting structure and can pass between the sensor 14c and the display unit 15a without interrupting the operation of the sensor 14c.

Figure 8:
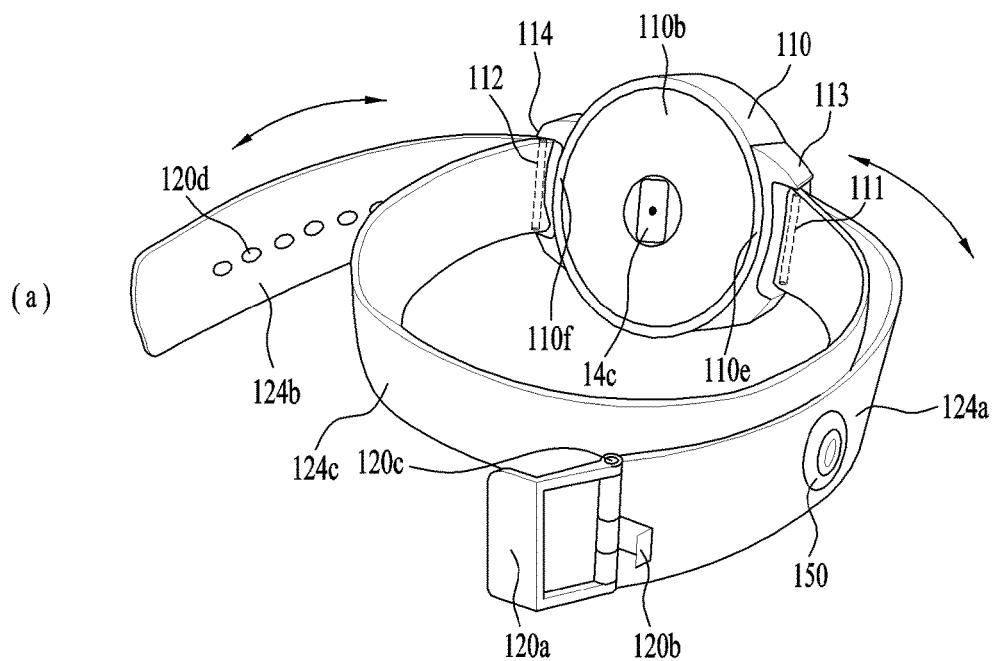
FIG. 8 is a perspective diagram for a different example of a band which is configured to be movable along a circumference direction of a wrist of a user.
Figure 8:
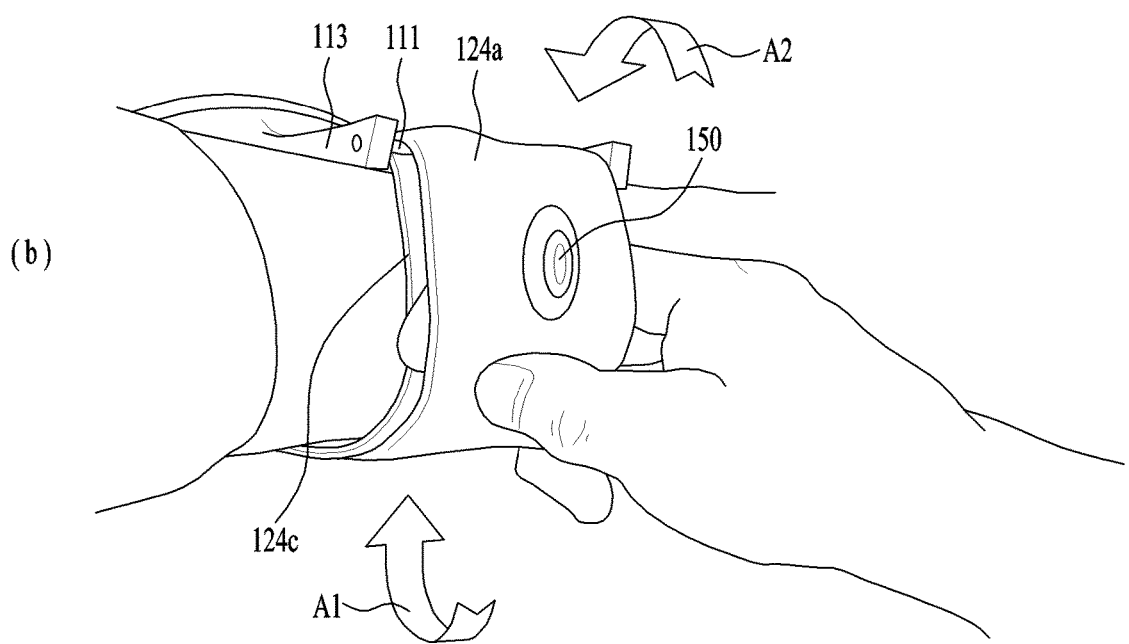
Figure 9:
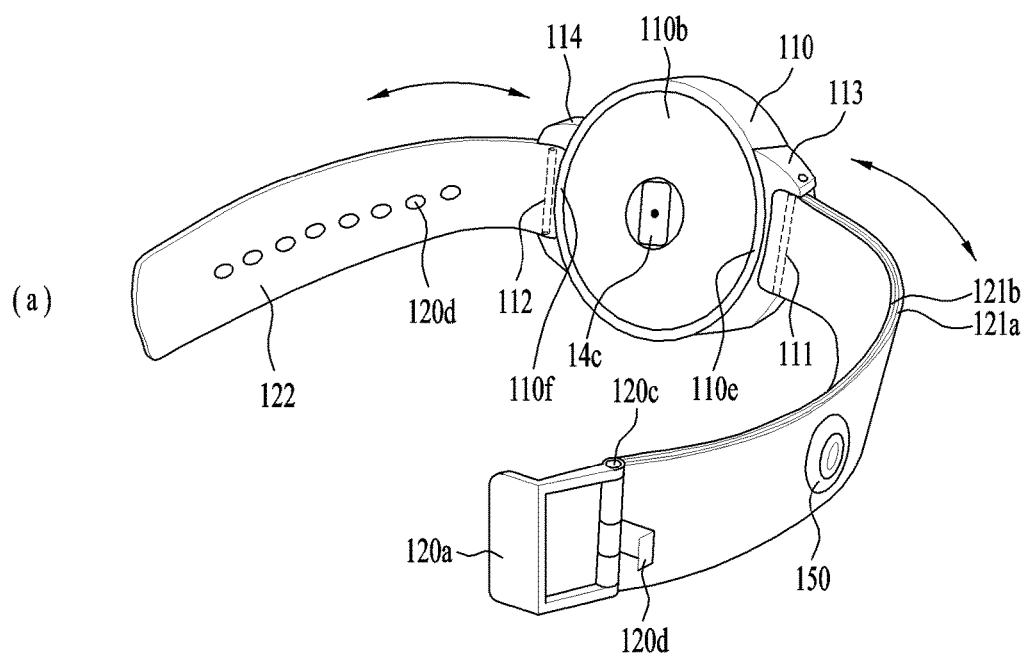
FIG. 9 is a perspective diagram for a further different example of a band which is configured to be movable along a circumference direction of a wrist of a user.
Figure 9:
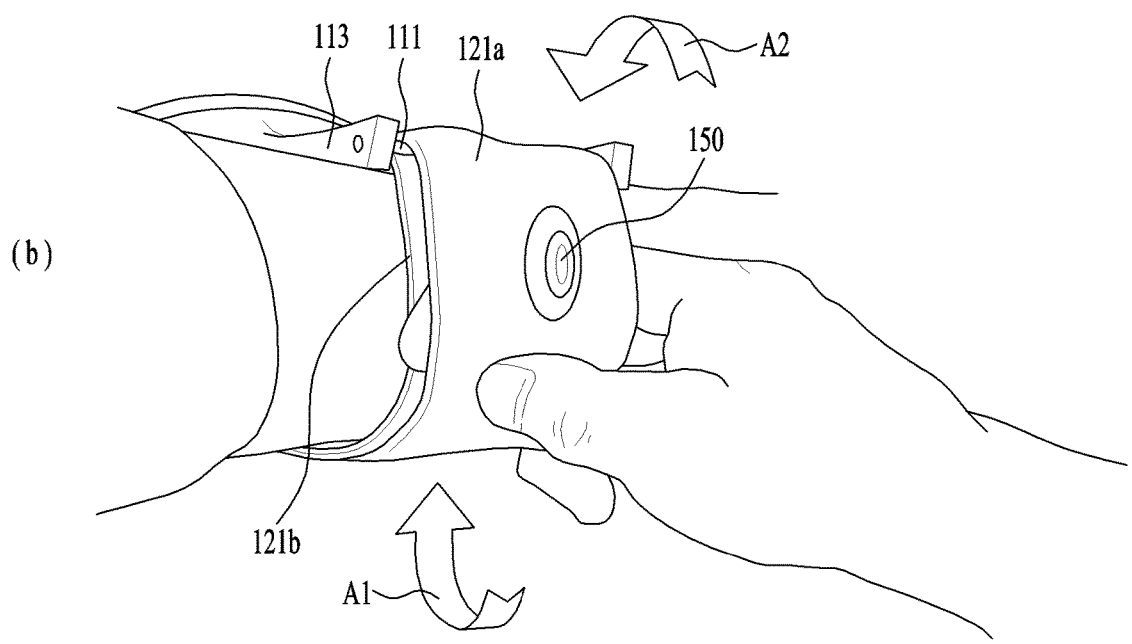

In addition to the configurations mentioned earlier in FIGS. 4 to 7, the band 120 may have a different configuration capable of moving in a circumference direction. FIG. 8 is a perspective diagram for a different example of a band which is configured to be movable along a circumference direction of a wrist of a user. FIG. 9 is a perspective diagram for a further different example of a band which is configured to be movable along a circumference direction of a wrist of a user. The band 120 is explained in detail in the following with reference to the drawings.

Similar to the band 120 mentioned earlier in FIG. 4, the band 120 of FIG. 8 can be configured with a single piece, i.e., a single strap. Yet, as shown in FIG. 8, the band 120 of the single piece can be configured to wrap around a wrist of a user one more time rather than penetrate the case 110. In particular, the band 120 shown in FIG. 8 can be configured to wrap around of a wrist of a user twice. More specifically, the band 120 wraps around a certain point (e.g., a first bar 111) of the case 110 and can continuously wrap around a wrist of a user. Subsequently, the band 120, which has wrapped around the wrist of the user, can wrap around a second bar 112. Both ends of the band 120 are connected with each other using the aforementioned fastener mechanism 120a to 120d. Consequently, the band 120 can wrap around the wrist of the user two times. In particular, the band 120 can include a first section 124a and a second section 124b selectively connected with the first bar 111 and the second bar 112, and a third section 124c wrapping around a wrist of a user.

Due to the abovementioned installation structure, the first section 124a and the second section 124b are not bound by the first bar 111 and the second bar 112 and can slide on the bars. As shown in FIG. 8 (a), if the first section 124a or the second section 124b moves, the whole of the band 120 can move in a circumference direction of a wrist of a user together with a camera 150. More specifically, as shown in FIG. 8 (b), if a user pulls the first section 124a down, the first section 124a can slide in the same direction on the first bar 111 along the first bar 111. If the first bar 111 is configured to be rotated, the first section 124a can more smoothly slide. Hence, the camera 150 mounted on the band 120 can move away from the case 110 according to the arrow A1 direction. On the contrary, if the user pushes the first section 123a up, the first section 124a can move along an arrow (A2) direction and the camera 150 can move towards the case 110. In particular, the orientation of the camera 150 can be adjusted by moving the band 120 and the camera 150 and the camera 150 can precisely face a subject.

Similar to the band 120 mentioned earlier in FIG. 2, a band 120 shown in FIG. 9 can include a first band 121 and a second band 122 coupled or separated with/from a first bar 111 and a second bar 112, respectively. A band including a camera 150 among the first band 121 and the second band 122 can be configured by two pieces facing each other. As shown in FIG. 9, if the camera 150 is mounted on the first band 121, the first band can include a first piece 121a and a second piece 121b which are deployed to face each other. The first piece 121a can include a camera while being exposed to the external and the second piece 121b can be directly contacted with a wrist of a user. Practically, the first band 121 can be configured as a single belt by the first piece 121a and the second piece 121b. More specifically, first of all, one end of the first band 121 can be wound around the first bar 111 installed in the case 110. Another end of the first band 121 can be wound around a third bar 120c installed in the band 120 itself. In particular, another end of the first band 121 can be installed in the third bar 120c for a fastener installed in the band 120. In particular, the first band 121 may correspond to a belt member respectively wound around the first bar 111 and the third bar 120c separated from each other with a prescribed space.

Due to the abovementioned installation structure, the first piece 121a and the second piece 121b of the first band 121 are not bound by the first bar 111 and the third bar 120c and may roll between the bars. As shown in FIG. 9(a), if the first piece 121a or the second piece 121b moves, the first band 121 can move in a circumference direction of a wrist of a user together with the camera 150. More specifically, as shown in FIG. 9(b), if a user pulls the first piece 121a down, the first band 121 rolls between the first bar 111 and the third bar 120c and the first piece 121a can move in the same direction. If the first bar 111 and the third bar 120c are configured to rotate, the first band 121 can more smoothly roll. Hence, the camera 150, which is installed in the first band 121 (i.e., the first piece 121a) can move away from the case 110 according to the arrow (A1) direction. On the contrary, if a user pushes the first piece 121a up, the first piece 121a can move along an arrow (A2) direction and the camera 150 can move towards the case 110. In particular, the orientation of the camera 150 can be adjusted by moving the band 120 and the camera 150 and the camera 150 can precisely face a subject.

Figure 10:
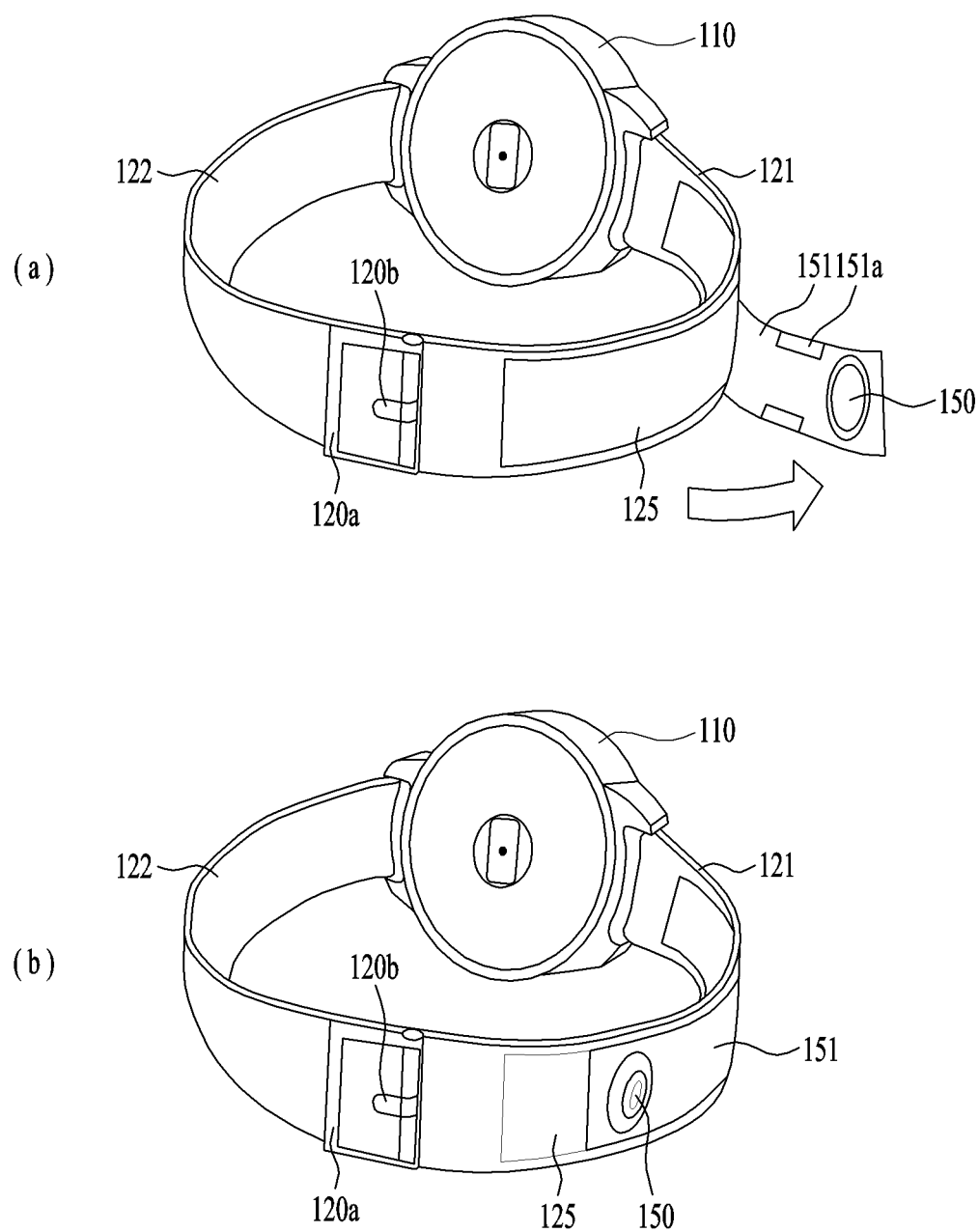
FIG. 10 is a perspective diagram illustrating an example of a camera which is configured to be movable.
Figure 11:
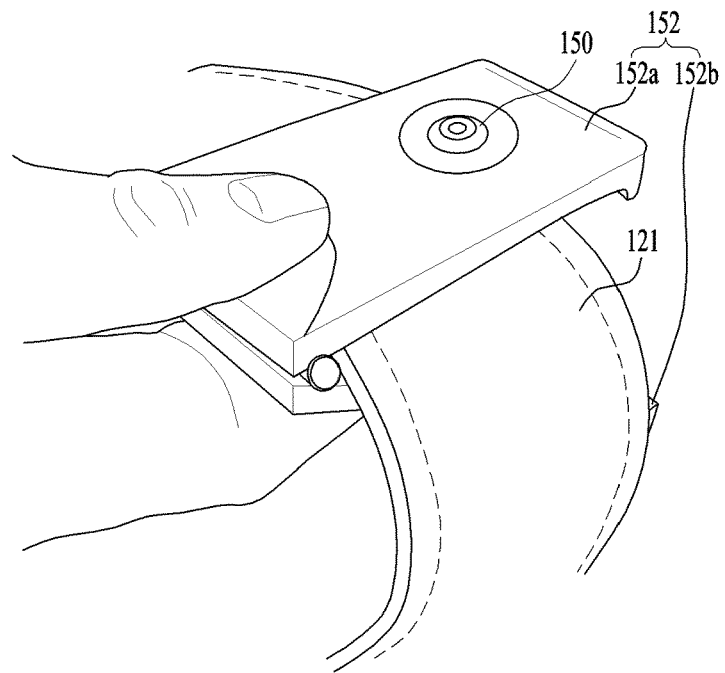
FIG. 11 is a perspective diagram illustrating a different example of a camera which is configured to be movable.
Figure 12:
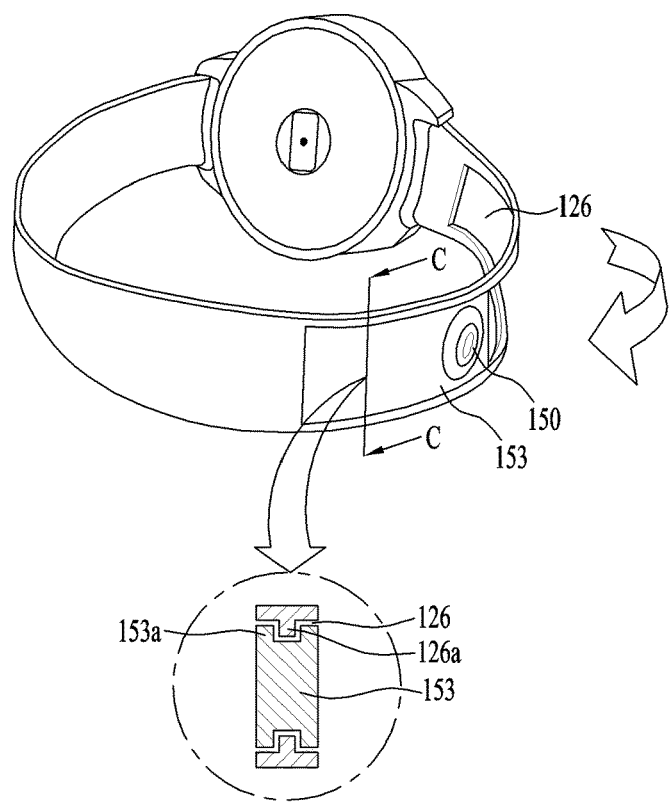
FIG. 12 is a perspective diagram illustrating a further different example of a camera which is configured to be movable.
Figure 13:
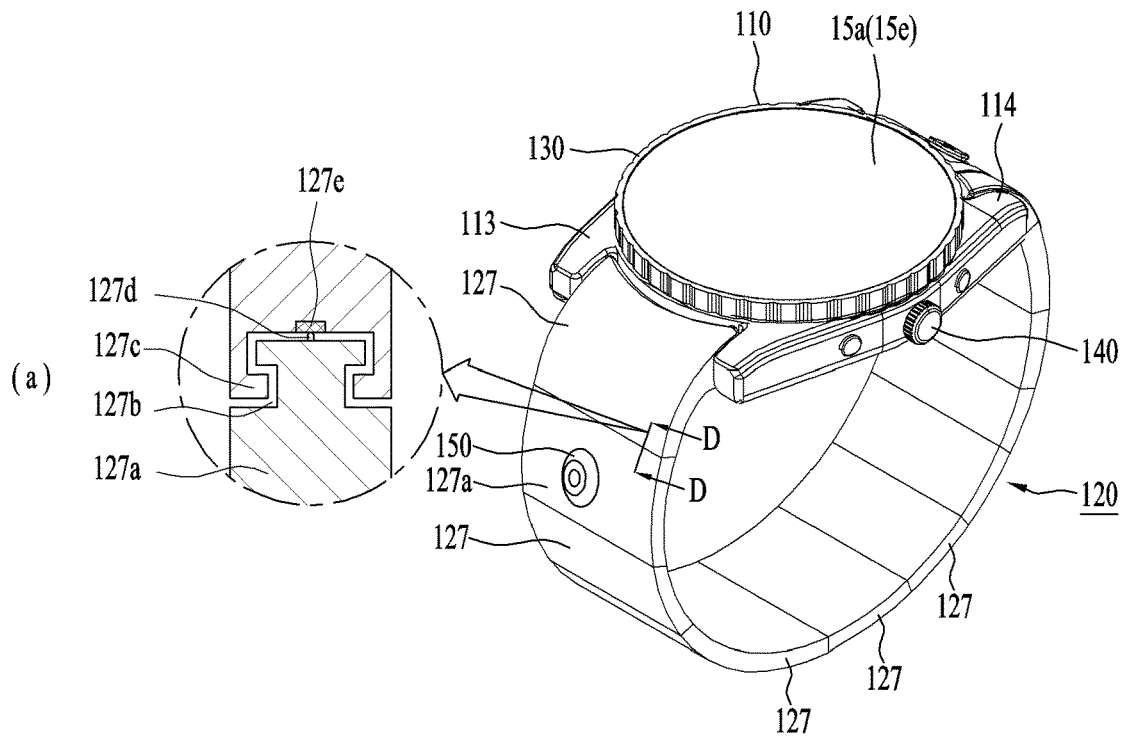
FIG. 13 is a perspective diagram illustrating a further different example of a camera which is configured to be movable.
Figure 13:
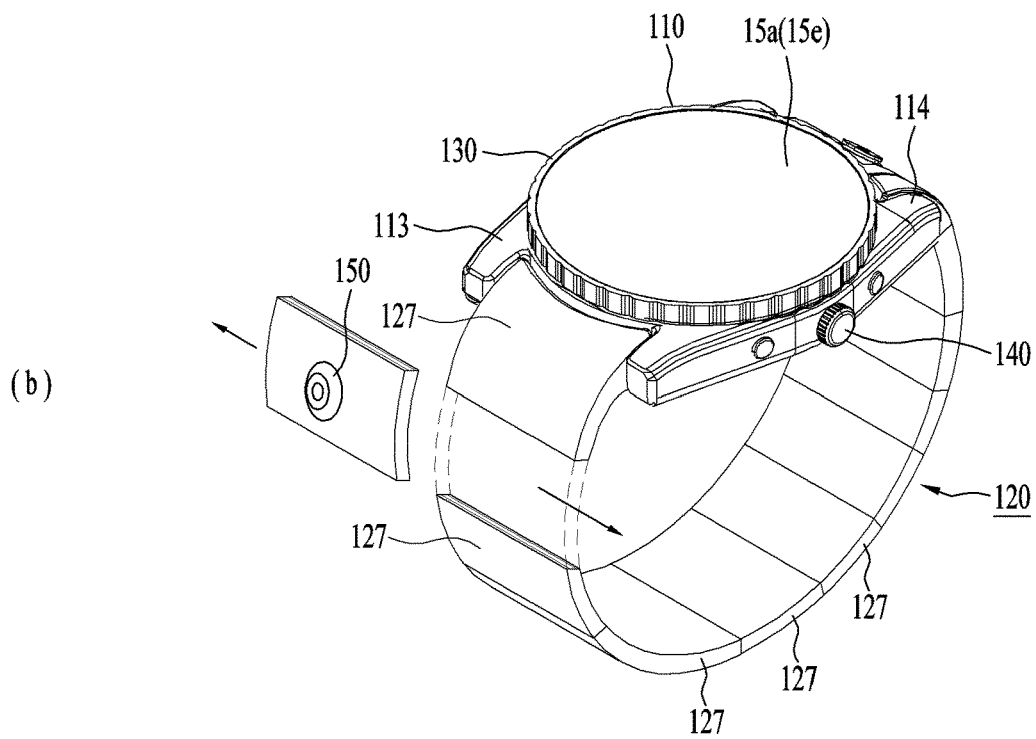

Unlike the movable band 120 mentioned earlier in FIGS. 4, 8, and 9, it may be able to configure the camera 150 to move along the band 120 to adjust the orientation of the camera 150. More specifically, the camera 150 can be configured to actively move on a stationary band 120 without moving the band 120 instead of passively moving the camera 150 by moving the band 120. In particular, the camera 150 can move and is deployed to a different position on the band 120 from a position of the band 120 to adjust the orientation of the camera. The movable camera 150 is explained in more detail in the following with reference to relevant drawings. FIG. 10 is a perspective diagram illustrating an example of a camera which is configured to be movable. FIG. 11 is a perspective diagram illustrating a different example of a camera which is configured to be movable. FIG. 12 is a perspective diagram illustrating a further different example of a camera which is configured to be movable. FIG. 13 is a perspective diagram illustrating a further different example of a camera which is configured to be movable.

Figure 19:
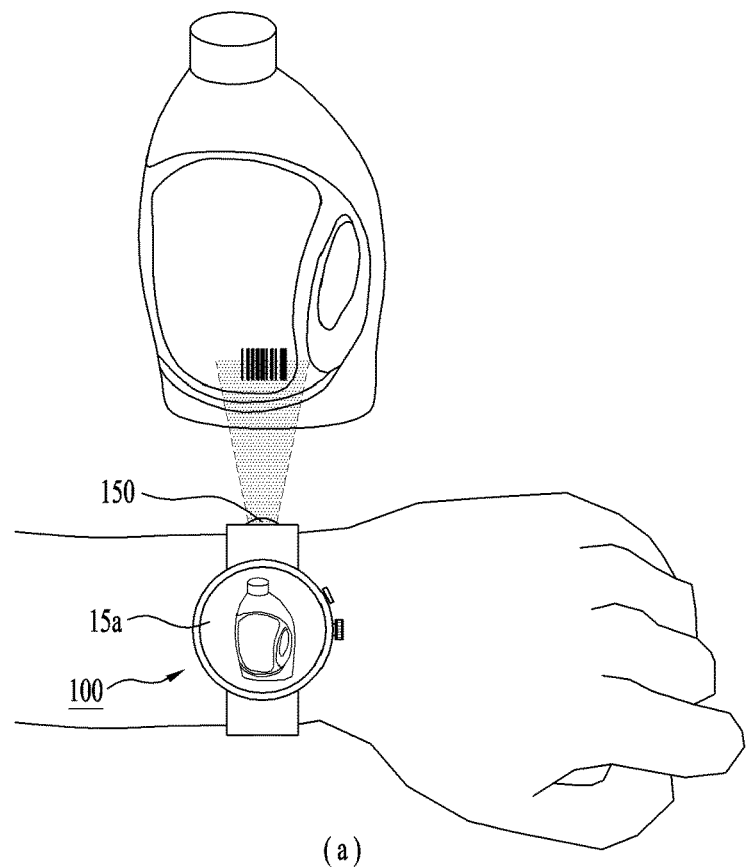
FIG. 19 is a schematic diagram illustrating a different example for a step of indicating and performing a related operation on a captured image when a camera captures an image of a bar code.
Figure 19:
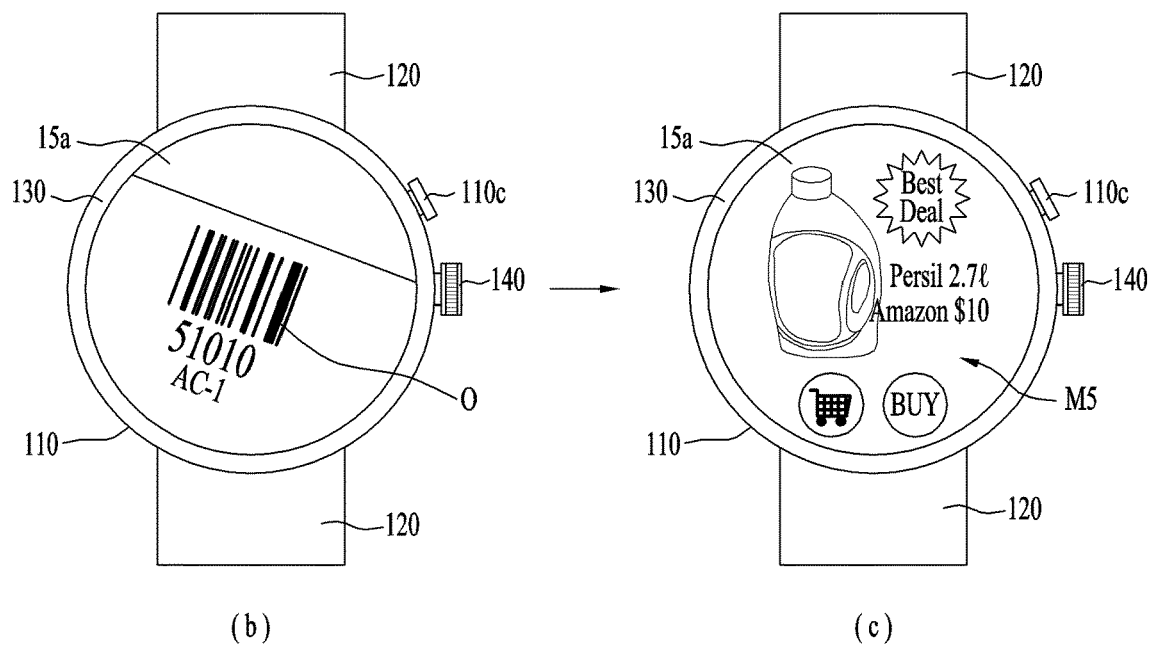

First of all, as shown in FIG. 10, the camera 150 can be configured to be detachable from the band 120. To this end, the camera 150 can include a strip 151 attached to the band 120 in a detachable manner. Similar to the band 120, the strip 151 may also have a body extended in a length direction. The camera 150 can be installed in the body. The band 120 can include a seat or a recess 125 which is extended according to a body of the band. The strip 151 of the camera 150 can be stably deployed to the recess 125. More specifically, the camera 150 can include an attaching member 151a installed in the strip 151. For example, the attaching member can be configured by a magnet or Velcro. And, at least a part of the band 120 (i.e., a part corresponding to the recess 125) can be configured to be attached/detached to/from the attaching member 151a. For example, a magnet or Velcro can be installed in the recess 125. As shown in FIG. 10 (a), the strip 151 and the camera 150 can be separated from the band 120. As shown in FIG. 19 (b), the strip 151 and the camera 150 can be attached to a different position of the band 120. In particular, the camera 150 can move to a position of the band 120 preferred by a user.

As shown in FIG. 11, it may be able to configure the camera 150 and the band 120 to be clamped together. To this end, the camera 150 may include a clip or a clamp 152 clamping the band 120. The clamp 152 can include a first member 152a and a second member 152b each of which is made of restorable elastic member. One end of the first member is connected with one end of the second member. The camera 150 can be installed in either the first member 152a or the second member 152b. FIG. 11 illustrates a case that the camera 150 is installed in the first member 152a. As shown in the drawing, if a user holds one end of the clamp 152, the elastic member is deformed and another end of the clamp 152 can be opened. In particular, if a user applies pressure on one ends of the first member 152a and the second member 152b, another ends of the first member 152a and the second member 152b can be away from each other due to the deformation of the elastic members. Hence, the clamp 152 and the camera 152 can be separated from the band 120. The separated camera 150 can be moved to a different position of the band 120 together with the clamp 152. Subsequently, if the user releases one end of the clamp 152, the elastic member is restored and another end of the clamp 152 is closed. Hence, the clamp 152 can be fixed at a different position of the band 120 together with the camera 150. By doing so, the camera 150 can be move to a position preferred by a user on the band 150.

As shown in FIG. 12, the camera 150 can be slidably coupled with the band 120. To this end, the camera 150 can include a strip 153 slidably coupled with the band 120. Similar to the band 120, the strip 151 may have a body extended in a length direction. The camera 150 can be installed in the body. The band 120 can include an opening 126 which is extended according to a body of the band and the strip 153 of the camera 150 is deployed to the opening 126. In particular, the strip 153 of the camera 150 can be slidably coupled with sidewalls of the opening 126. More specifically, as shown in a cross section according to a line C-C of FIG. 12, a part of the band 120 facing the strip 153 (i.e., a protrusion 126a protruded from a sidewall of the opening 126) can be extended towards the strip 153. And, a recess 153a for accepting the protrusion 126a can be formed on a part of the strip 153 facing the band 120 (i.e., a side of the strip 153). Unlikely, a protrusion and a recess can be formed on the strip 153 and the band 120, respectively. As shown by an arrow, the strip 153 can slide according to a length direction of the band 120 while being guided by the protrusion 126a. Hence, the camera 150 and the strip 153 can move to a preferred position of the band 120 by the sliding movement. The camera 150 can be slid on the band 120 by a structure different from the structure shown in FIG. 12. For example, a recess shown in FIG. 10 can be formed on the band 120 instead of the opening 126. Hence, the strip 153 can be configured to be slid on the recess.

Moreover, as shown in FIG. 13, the band 120 can include parts configured to be coupled with each other in a detachable manner. To this end, the band 120 can include a plurality of sections 127 coupled with each other in a detachable manner. A camera 150 can be mounted on a section among a plurality of the sections. In particular, the sections 127 can include a first section 127a including the camera 150. The sections 127 can be coupled with each other in various ways. As well shown in FIG. 13 (*b*), a section can be slidably coupled with adjacent other sections. More specifically, as shown in a cross section according to a line D-D of FIG. 13 (*a*), the first section 127a can include a grove 127b formed on a body of the first section. And, a different section adjacent to the first section 127a can include a protrusion 127c configured to be inserted into the groove 127b. One of the sections 127/127a can include a first end and a second end respectively coupled with other sections adjacent to the section including the first end and the second end. For the smooth coupling, the aforementioned groove 127b and the protrusion 127c can be deployed to the first end and the second end, respectively. The groove 127b and the protrusion 127c can be extended in various directions. For example, as shown in FIG. 13, the groove 127b and the protrusion 127c can be extended in a width direction of the first section 127a and the sections 127. As shown in FIG. 13 (*b*), the first section 127a can be slid in an arrow direction (i.e., in a width direction of the first section) while being guided by the protrusion 127c. The first section 127a can be separated from the adjacent sections 127 as a result of the sliding movement. Subsequently, the first section 127c can be deployed between sections 127 different from the adjacent sections 127 using a method similar to the abovementioned method. In particular, the first section 127a can be replaced with one of the sections 127. The first section can be deployed to a position of the replaced section 127. By doing so, the camera 150 can be moved to a preferred position of the band 120 together with the first section 127a.

The first section 127a and the camera 150 mounted on the first section are able to basically communicate with electronic components (e.g., a controller 18) included in the case 110 in wireless. Yet, the first section 127a and the camera 150 mounted on the first section are able to communicate with the parts in wired as well. For example, as shown in a cross section of FIG. 13 (*a*), the first section 127a can include a pin 127d and a different section 127 adjacent to the first section can include an electronic contact 127e contacted with the pin 127d. As mentioned in the foregoing description, one of the sections 127/127a can include a first end and a second end respectively coupled with other adjacent sections 127. For electrical connectivity, the pin 127d and the contact 127e can be deployed to the first end and the second end, respectively. The pin 127d and the contact 127e, which are respectively deployed to the first end and the second end, can be electrically connected with each other using a wire. The pin 127d/contact 127e connects the first section 127a and the camera 150 mounted on the first section to the case 110 and the board 13 of the case 110 via a different section 127 in wire. The first section 127a and the camera can communication with related components.

As mentioned earlier in FIGS. 4 to 13, the camera 150 can move towards the case 110 or move away from the case 110 while moving along the band 120. A position of the camera 150 can be adjusted to make the position to be precisely oriented towards a subject. It is able to efficiently and conveniently obtain an image of a preferred subject. When the camera 150 is additionally configured to be movable according to the examples mentioned earlier in FIGS. 10 to 13, the configuration does not influence on operations of the examples using the movement of the band 120 according to FIGS. 4 to 9. In particular, the smart watch 100 can include the characteristic according to FIGS. 4 to 9 (i.e., the movable band 120) and the characteristic according to FIGS. 10 to 13 (i.e., the movable camera 150) at the same time.

Meanwhile, it is necessary for a user to activate (i.e., turn on) a camera 150 before a preferred image is captured. In general, a switch can be installed in the camera 150 to activate the camera 150. Yet, since the camera 150 corresponds to a small module separated from a main body (i.e., case 110) of the smart watch 100, it may be difficult to install the switch in the camera module 150. Although the switch is installed in the camera module, a user is not easy to control the switch due to the small size of the switch. Hence, it may be able to unnecessarily increase the size of the camera module 150. Moreover, it may be inappropriate to always activate the camera 150 due to the restriction on power capacity. Meanwhile, as mentioned in the foregoing description, in most cases, a user moves the camera 150 before capturing an image to make the camera to be precisely oriented towards a subject. In particular, the movement of the camera 150 may indicate the practical use of the camera 150. For this reason, if the camera 150 moves along the band 120, it may be able to configure the camera 150 to be automatically activated. Of course, in addition to the above characteristic, the camera 150 can include a switch for passive activation.

For the automatic activation, the smart device 100 can further include a sensor configured to sense a movement of the camera 150. The sensor can be configured to directly sense the movement of the camera 150. For example, the sensor may correspond to a motion sensor configured to sense a movement of the camera 150 while being installed in the case 110.

Meanwhile, as mentioned in the foregoing description, since the camera 150 is configured to move along the band 120, as shown in FIG. 4, a movement of the camera 150 may change a distance (D) between the camera 150 and the case 110. Hence, if the change of the distance (D) is sensed, it may be able to sense the movement of the camera 150. For this reason, the sensor can be configured to directly measure or sense the change of the distance (D) between the camera 150 and the case 110 to indirectly sense the movement of the camera 150. Meanwhile, the change of the distance (D) can be sensed by the sensor based on the measured distance (D). In FIG. 4, although the distance (D) is represented by a circumference direction distance obtained according to the band 120, a straight line distance between the camera 150 and the case 110 may become the distance (D).

More specifically, the sensor can be configured by a non-contact distance sensor to measure or sense the distance (D). For example, the distance sensor may use a light, ultrasonic wave, or the like. The distance sensor radiates a light or a sound wave received from one of the case 110 and the camera 150 to another and can sense a distance using a returned light or sound wave. The distance sensor can include a transmitting unit and a receiving unit respectively installed in the case 100 and the camera 150 and can sense a distance using a light or sound wave forwarded between the transmitting unit and the receiving unit. Since the non-contact distance sensor does not require a physical connection with the camera 150 to sense a distance, the non-contact distance sensor can be applied to examples of all cameras 150 mentioned earlier in FIGS. 4 to 10. Meanwhile, the sensor may include a resistive sensor configured to sense a change of resistance occurred by a movement of the camera 150 or the band 120. For example, as shown in FIG. 7, the resistive sensor is deployed to the supporter 13*a* and can be contacted with the band 120 (i.e., the third section 123*c*). If the third section 123*c* moves together with the camera 150, a part of the third section 123*c* contacted with the resistive sensor is changed. Hence, a resistance value can be changed as well. Hence, the resistive sensor can sense a change of a distance by sensing the changed resistance value. The resistive sensor can be applied not only to examples of FIGS. 10 and 12 using a movement of a stream, but also to examples of FIGS. 4, 8 and 9 without any considerable deformation. Meanwhile, the sensor can be configured by a switch including a plurality of fixed contact points arranged at prescribed positions and a moving contact point configured to be contacted with one of a plurality of the fixed contact points while moving. For example, in FIG. 7, instead of the resistive sensor 13*d*, the supporter 13*a* can include a plurality of fixed contact points 13*d*, which are deployed along a length direction of the band 120 (i.e., the third section 123*c*) and are contacted with the third section 123*c*. And, the moving contact point can be attached to a prescribed part of the third section 123*c*. When the third section 123*c* continuously moves together with the camera 150, the moving contact point of the third section 123*c* can move together. The moving contact point is sequentially contacted with fixed contact points different from each other to generate a different electrical signal and receives the signal. The controller 18 can sense a distance (D) and a change of the distance (D). The contact point switch can be applied not only to examples of FIGS. 5, 8 and 9 using a movement of the band 120, but also to examples of FIGS. 10 and 12 without any considerable deformation. And, in the example of FIG. 12, the pin 127*d* of the first section 127*a* may become a moving contact point and contact points 127*e* of other sections 127 may become fixed contact points. In particular, when the pin 127*d* of the first section 127*a* is contacted with the contact points 127*e* of other sections 127, signals different from each other can be generated. The controller 18 receives the signals to sense a relative position of the first section 127*a*, a distance (D), and a change of the distance.

Since the camera 150 is automatically activated by the movement of the camera, it is not necessary for a user to perform an additional operation for turning on the camera 150. And, the activation of the camera 150 can be performed when the camera 150 is practically used, i.e., when the camera 150 is moved. Moreover, automatic activation of the camera 150 can be achieved by a considerably simple mechanism. Hence, a user can more conveniently and efficiently use the camera 150 without the practical increase of manufacturing cost.

Meanwhile, the aforementioned smart watch 100 may enable even a smart watch 100 having a small size to capture an image by including a movable camera 150 in the smart watch 100. Since it is able to make the movable camera 150 to be precisely oriented towards a subject, the smart watch 100 can more conveniently and efficiently obtain an image. However, in order to provide a more enhanced function to a user, it is necessary to appropriately control the camera 150 and structures related to the camera in consideration of the structure and the characteristic of the smart watch 100. When an intended function is implemented by the smart watch 100, the function basically involves an interaction with a user. Hence, if various controls are optimized, it is able to more effectively and efficiently achieve an enhancement of user environment and user interface and an enhancement of intended functionality. Moreover, it may also be able to considerably enhance such user experience for a smart device 100 as easy to use, convenience, and the like based on the optimized controls. For this reason, a control method for the smart watch shown in FIGS. 1 to 13 has been developed. In the following, the control method is explained with reference to relevant drawings in addition to FIGS. 1 to 13. If there is no special opponent description, FIGS. 1 to 8 and description on the drawings are basically included in the explanation on the control method.

Figure 14:
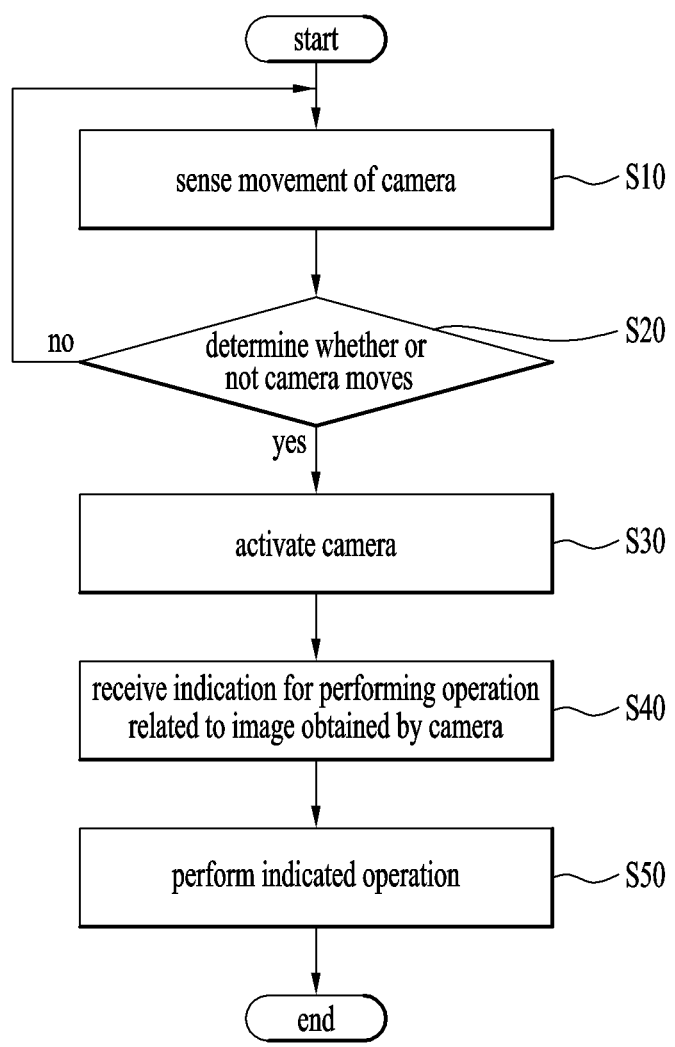
FIG. 14 is a flowchart for a method of controlling a smart watch described in the present specification.

FIG. 14 is a flowchart for a method of controlling a smart watch described in the present specification. Control methods described in the following control the configuration elements, which have been explained with reference to FIGS. 1 to 8, i.e., operations of various components, and can provide intended functions based on the operations. Hence, the operations and functions related to the control method can be regarded not only as the characteristic of the control method, but also as the characteristic of relevant structural configuration elements. In particular, a control unit or a processor 18 can be referred to as various names such as a controller, a controlling device, and the like and can control all configuration elements of the smart watch 100 to perform a prescribed operation. In particular, the controller 180 practically controls all methods and modes described in the following in the present specification. Hence, all steps described in the following may become the characteristics of the controller 18. For this reason, although it is not explained as a step is performed by the controller 18 or the smart watch 100, all steps described in the following and detail characteristics of the steps should be construed as the characteristic of the controller 18.

First of all, in order to use a smart watch 100, a user can arrange the smart watch 100 to a body of the user. In particular, the user can wear the watch 100 on a wrist of the user. A control method is explained with reference to the watch 100 worn on the wrist of the user. Meanwhile, the user may use the watch 100 while holding the watch 100 by a hand rather than wearing the watch on a body of the user. Hence, control methods described in the following can be applied to all cases including a case of wearing the watch on a wrist of a user, a case of arranging the watch to a body of a user, a case of contacting the watch with the body of the user, and the like.

While the smart watch 100 is used by a user, the smart watch 100 can sense a movement of a camera 150 [S10]. As mentioned in the foregoing description, it may be difficult to operate the camera 150 having a small size to activate the camera 150 and it may make a user inconvenient. Yet, in most cases, a user moves the camera 150 before capturing an image to make the camera to be precisely oriented towards a subject. In particular, the movement of the camera 150 may indicate that the camera 150 is practically used to obtain an image. Hence, the movement of the camera 150 can be used as an indicator for activating the camera 150. The smart watch 100 can sense the movement of the camera to control the camera based on the indicator. In order to precisely control the camera 150, the sensing step [S10] can be continuously performed while the smart watch 100 is operating.

As mentioned earlier in the examples of FIGS. 4 to 9, the movement of the sensed camera 150 can include a case that the band 120 moves according to a circumference direction of a wrist of a user together with the camera 150. And, as mentioned earlier in the examples of FIGS. 10 to 13, the movement of the sensed camera 150 can include a case that the camera 150 moves to a different position of the band 120 from a certain position of the band 120. In particular, according to the examples shown in FIGS. 4 to 9, the camera 150 is passively moved according to the movement of the band 120. On the other hand, according to the examples shown in FIGS. 10 to 13, the camera 150 can actively move in a stationary state without the movement of the bands 120. In the sensing step S10, the movement can be sensed using a separate sensor. For example, the sensor can be configured by a motion sensor. The motion sensor can directly sense the movement of the camera 150. Meanwhile, since the camera 150 moves along the band 120, the movement of the camera 150 may be able to make a distance (D) (refer to FIG. 4) between the camera 150 and the case 110 to be changed. In particular, the distance (D) can be changed by moving the band 120 and the camera 150 according to a circumference direction of a wrist of a user. Or, the distance (D) can be changed by deploying the camera 150 to a different position of the band 120. Hence, the sensor can be configured to sense a change of the distance (D) and can indirectly sense the movement of the camera 150 as well. For example, the sensor can include a switch including a non-contact distance sensor, a resistive sensor, a fixed contact point, and a moving contact point. Since an operation of the sensor configured to sense the movement of the camera 150 has been explained in detail with reference to the related drawing, additional explanation on the sensor is omitted in the following description.

If the movement of the camera 150 is sensed, the smart watch 100 can determine whether or not the camera 150 is practically moved [S20]. In case of using a motion sensor, the movement of the camera 150 is directly sensed by the motion sensor. Hence, the smart watch 100, i.e., the controller 18, can immediately determine an occurrence of the movement based on a sensing result received from the motion sensor. On the other hand, in case of using a non-contact distance sensor, a resistive sensor, a switch, or the like, the smart watch 100, i.e., the controller 18, can determine whether or not a distance (D) is changed based on signals and a sensing result received from the sensors and the switch. Subsequently, if it is determined that the distance (D) is changed, the controller 18 can determine it as the camera 150 has moved.

If the movement of the camera 150 is not sensed and determined, the smart device 100 can continuously perform the sensing step and the determining step [S10, S20]. On the other hand, if the movement of the camera 150 is sensed and determined, i.e., if the movement of the camera 150 practically occurs, the smart device 100 can activate the camera 150 [S30]. The activation of the camera 150 is to turn on power of the camera 150. Hence, the camera 150 can capture an image.

If an image is captured by the activated camera 150, the smart watch 100 can receive an indication for performing an operation preferred by a user [S40]. The smart watch 100 can implement various functions to satisfy the necessity of the user. The functions can be achieved by an operation associated with prescribed configuration elements of the smart watch 100. Hence, in order to perform an operation for an intended function, a user can input a prescribed indication to the smart watch 100 and the smart watch 100 can receive the indication. Hence, the receiving step [S40] may become the most basic step for implementing a function and performing control itself. In particular, since the camera 150 is moved and activated by a user, it may be able consider it as the user intended to capture an image using the camera 150. In the receiving step [S40], the smart watch 100 can receive an indication for an operation related to a captured image from the user. Meanwhile, the camera 150 can be unintentionally moved due to various reasons (e.g., malfunction). If the camera 150 is continuously activated due to the unintentional movement, it may waste power. Hence, if an indication is not received from a user during prescribed time after the camera 150 is activated, the smart watch 100 can deactivate the camera 150. In particular, if there is no additional indication, the camera 150 can be turned off. It may be able to prevent power waste and additional malfunction based on the deactivation of the camera. After the receiving step [S40], the watch 100 can perform an indicated operation [S50]. More specifically, if the watch 100 receives an indication of a user, corresponding configuration elements perform an indicated operation according to the received indication. Hence, an intended function can be finally performed in the smart watch 100.

The schematic control methods, which have been explained with reference to FIG. 14, can be configured in more detail according to a different situation to provide intended functions to a user. A method of controlling the smart watch 100 according to a situation is explained in detail with reference to a related drawing. Detailed control methods described in the following can be practically distinguished from each other in a receiving step and a performing step [S40, S50]. Since the performing step [S50] corresponds to a step of generating a result or an output according to an indication inputted in the receiving step [S40], detailed control methods according to a situation can be configured by a single set or a plurality of sets of the receiving step [S40] and the performing step [S50].

Figure 15:
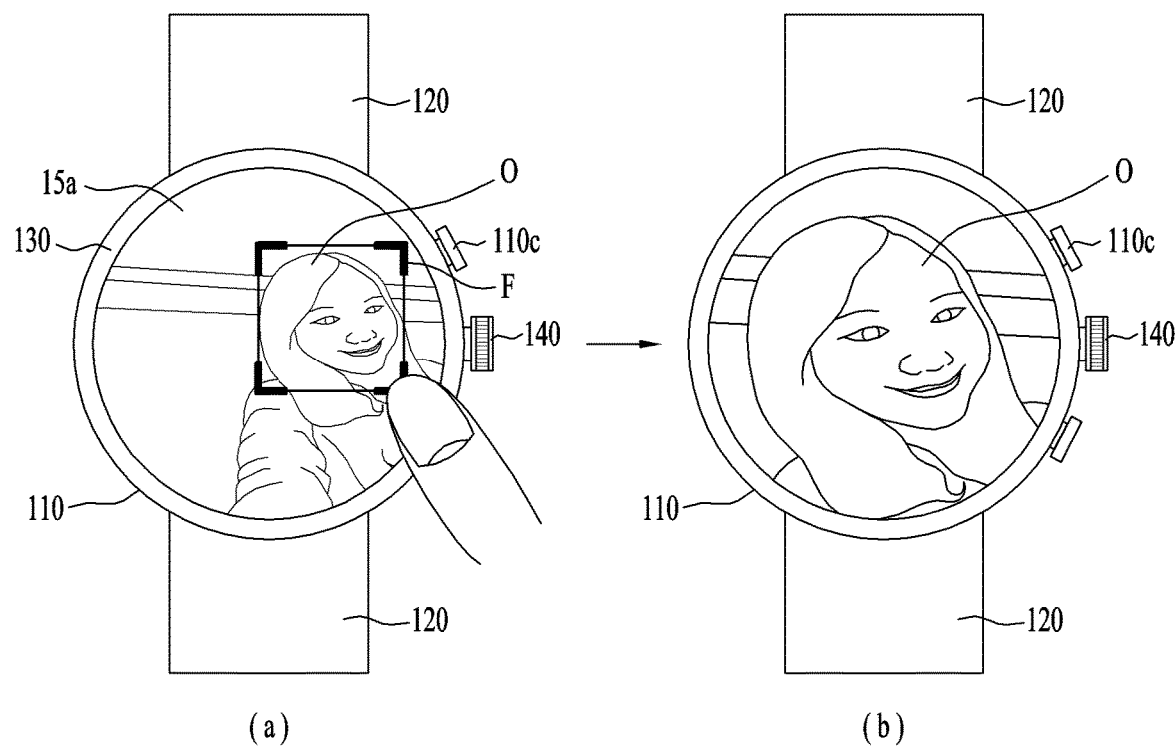
FIG. 15 is a schematic diagram illustrating a step of indicating and performing a related operation on a captured image when a camera captures an image of a person.

First of all, as shown in FIG. 15, if the camera 150 is activated by the aforementioned steps [S10 to S30], the activated camera 150 can obtain an image of a person (O) as a subject. The obtained image can be displayed on the display unit 15a of the smart device 100. In this case, as shown in FIG. 15 (a), the camera 150 can automatically focus on a person belonging to the image as a preliminary receiving step [S40]. More specifically, the controller 18 firstly analyzes the obtained image and can automatically recognize a pattern of a face of the person in the analyzed image. The controller 18 can display the recognition of the face by assigning a frame (F) to the face of the person belonging to the image. The controller can focus on the face of the frame (F) by controlling a lens and a sensor of the camera 150. After the focusing, manipulation of a prescribed user can be provided to the smart watch 100. The manipulation of the user can be used for indicating the smart watch 100 to perform an operation on the obtained image. The smart watch 100 can receive the indication by the manipulation [S40]. For example, as shown in FIG. 15 (a), a user may double tap or long press the recognized face belonging to the frame (F), i.e., a part of the display unit 15a on which the recognized face is displayed. A touch sensor of the display unit 15a recognizes the manipulation as an indication of a user and can deliver the indication to the controller 18. In the foregoing description, although an example of recognizing a face has been explained only, the whole body of a person including a face can be recognized and captured.

As mentioned in the foregoing description, if a predetermined manipulation of a user is provided, the smart watch 100 can control the camera 150 to capture an image of a person (O) [S50]. In the capturing step [S50], the smart watch 100 can arrange the person (O), i.e., a recognized face of the person, at the center of the image. And, the smart watch 100 can control an image to be captured according to a prescribed condition. More specifically, the smart watch can control brightness, contrast, and the like of the image to be optimized in consideration of surrounding environment. The image may have enhanced quality according to the arrangement and the control. The captured image corresponds to an independent digital image distinguished from images continuously captured by the camera 150 and can be stored in the memory 17 of the smart watch 100.

Figure 16:
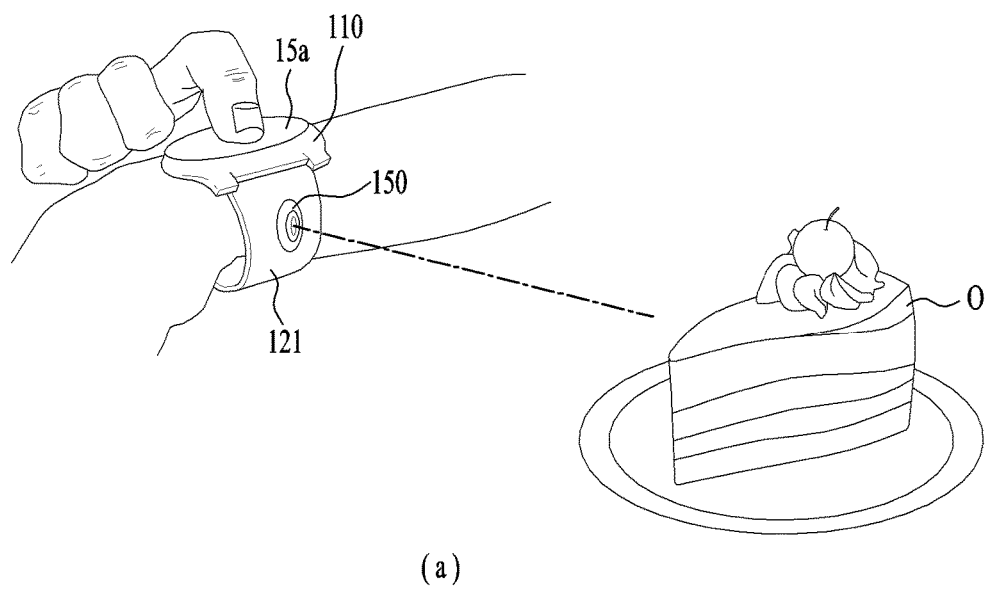
FIG. 16 is a schematic diagram illustrating an example for a step of indicating and performing a related operation on a captured image when a camera captures an image of a person or an object.
Figure 16:
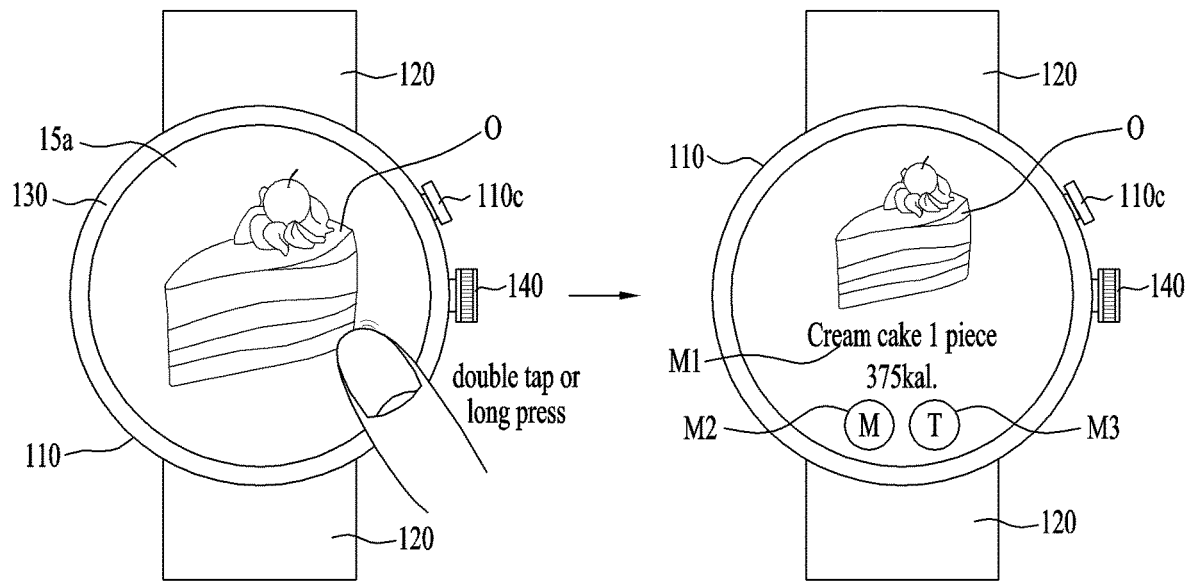

As shown in FIG. 16 (a), if the camera 150 is activated by the aforementioned steps [S10 to S30], the activated camera 150 can obtain an image of an object (O) as a subject. The obtained image can be displayed on the display unit 15a of the smart device 100. In this case, as shown in FIG. 16 (a), manipulation of a prescribed user can be provided to the smart watch 100. The manipulation of the user can be used for indicating the smart watch 100 to perform an operation on the obtained image. The smart watch 100 can receive the indication for an intended operation by the manipulation [S40]. For example, as shown in FIG. 16 (b), a user may double tap or long press the object (O) displayed on the display unit 15a. A touch sensor of the display unit 15a recognizes the manipulation as an indication of a user and can deliver the indication to the controller 18.

Subsequently, the smart watch 100 can search for information on the object (O) [S50]. In the searching step [S50], the smart watch 100 may search for information stored in the memory 17 of the smart watch in advance or information on the Internet or other network. As shown in FIG. 16 (c), the smart watch 100 can provide the searched information to a user by displaying the information on the display unit 15a [S50]. For example, if the object (O) corresponds to a cream cake, the smart watch 100 can provide the user with information (M1) such as a calorie of the cake belonging to the image, a recipe of the cake, a store selling the cake, and the like. The smart watch 100 can additionally provide the user with a menu (M2) capable of storing the provided information and/or a menu (M3) capable of sharing the provided information with other persons. Meanwhile, although the aforementioned control method has been explained in relation to an object, the control method can be identically performed when a person is included in an obtained image. For example, when an image of a person is obtained, the smart watch 100 searches for information on the person based on the manipulation of the user and can provide the searched information to the user.

Figure 17:
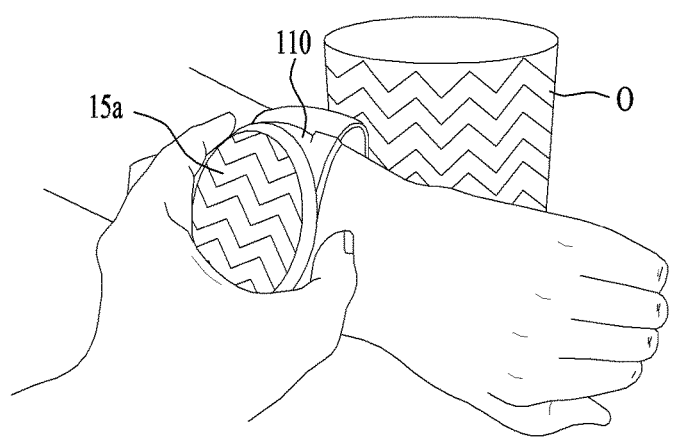
FIG. 17 is a schematic diagram illustrating a different example for a step of indicating and performing a related operation on a captured image when a camera captures an image of a person or an object.
Figure 17:
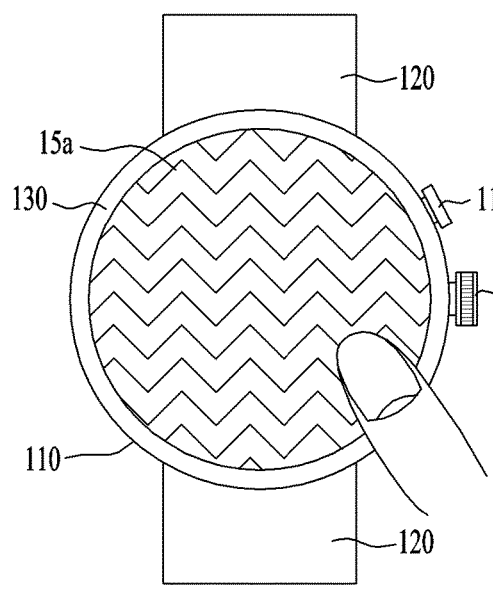
Figure 17:
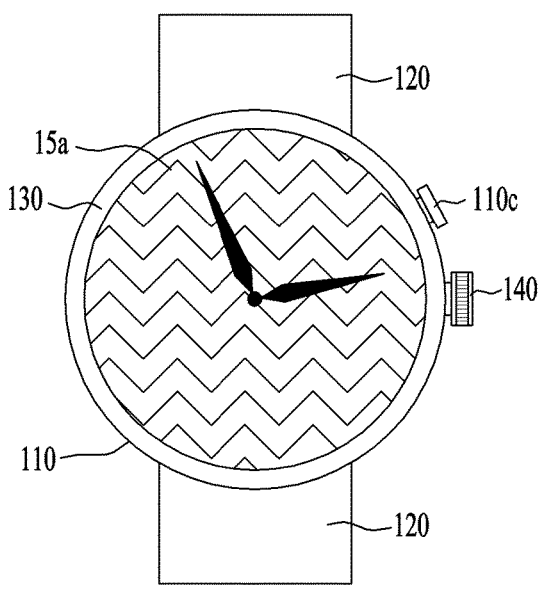

As shown in FIG. 17 (a), if the camera 150 is activated by the aforementioned steps [S10 to S30], the activated camera 150 can obtain an image of an object (O) as a subject. The obtained image can be displayed on the display unit 15a of the smart device 100. Referring to the example, the camera 150 obtains an image of a cup (O). In particular, an image of a pattern printed on the cup (O) is displayed on the display unit 15a. In this case, as shown in FIG. 17 (a), manipulation of a prescribed user can be provided to the smart watch 100. The manipulation of the user can be used for indicating the smart watch 100 to perform an operation on the obtained image. The smart watch 100 can receive the indication for an intended operation by the manipulation [S40]. For example, as shown in FIG. 17 (b), a user may double tap or long press the object (O) displayed on the display unit 15a. A touch sensor of the display unit 15a recognizes the manipulation as an indication of a user and can deliver the indication to the controller 18.

Subsequently, the smart watch 100 can apply the obtained image of the object (O) to a face or a dial of the smart watch 100 [S50]. In the applying step [S50], for example, the smart watch 100 can store the obtained image of the object (O), i.e., the pattern of the cup, in the memory 17 and can display the stored pattern via the display unit 15a. In particular, as shown in FIG. 17 (c), the image of the object (O), i.e., the pattern of the cup, can be continuously displayed on the display unit 15a as a sort of wallpaper. Subsequently, a result (e.g., current time (i.e., an hour hand and a minute hand)) according to a different function of the smart watch 100 can be provided to a user together with the pattern of the cup. In particular, the image obtained by the aforementioned control method can be immediately applied as wallpaper of the smart watch 100. The wallpaper can be modified using an additionally obtained image according to a preference of the user. Meanwhile, although the aforementioned control method has been explained in relation to an object, the control method can be identically performed when a person is included in an obtained image. For example, when an image of a person is obtained, the smart watch 100 may apply the image of the person to a face or a dial of the smart watch 100 based on the manipulation of the user.

Figure 18:
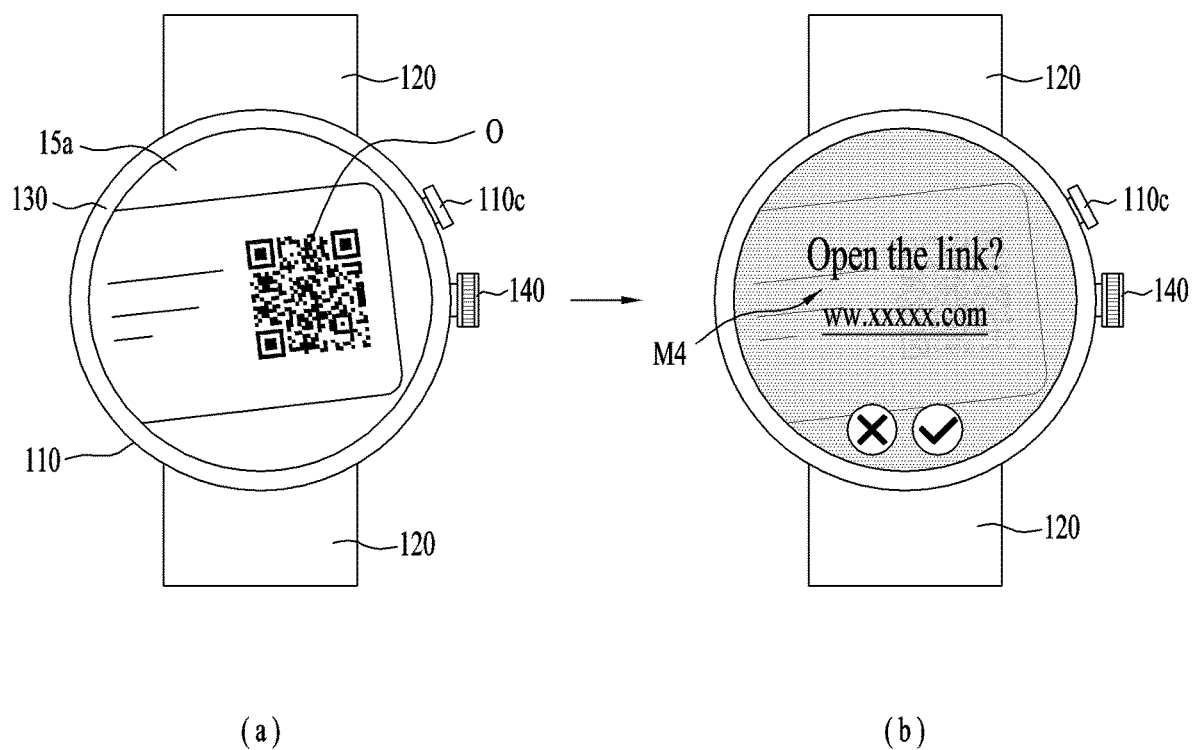
FIG. 18 is a schematic diagram illustrating an example for a step of indicating and performing a related operation on a captured image when a camera captures an image of a bar code.

As shown in FIG. 18 (a), if the camera 150 is activated by the aforementioned steps [S10 to S30], the activated camera 150 can obtain an image of a bar code (O) as a subject. The bar code may correspond to a 2D bar code (including QR code) or a 3D bar code. Referring to an example of FIG. 18 (a), the camera 150 is capturing an image of a bar code included in a business card of a specific person. In this case, the smart watch 100 can automatically recognize the bar code (O) [S40]. In the recognizing step [S40], since the smart watch 100 receives information included in the recognized bar code (O), the reception of the information may be identical to reception of an indication for a prescribed operation. For example, in FIG. 15 (a), the bar code included in the business card may include detail information on the specific person or a link for a source including the information. And, the bar code may include an indication for displaying the information or the source.

Subsequently, the smart watch 100 can display information associated with the recognized bar code on the display unit 15a [S50]. In the displaying step [S50], for example, the smart watch 100 can display a link (M4) for the detail information on the specific person or the source including the information on the display unit 15a.

As shown in FIG. 19 (a), if the camera 150 is activated by the aforementioned steps [S10 to S30], the activated camera 150 can obtain an image for a bar code (O) of a product. In this case, as shown in FIG. 19 (b), the smart watch 100 can automatically recognize the bar code (O) [S40]. For example, in FIG. 19 (b), the recognized bar code may include information on the product. More specifically, the recognized bar code can include a product name, a volume of the product, a serial number of the product, and the like. Subsequently, the smart watch 100 can provide information and an option (M5) for purchasing the product based on the recognized information [S50]. In the providing step [S50], the smart watch 100 may search for information stored in the memory 17 of the smart watch in advance or information on the Internet or other network. As shown in FIG. 19 (c), the smart watch 100 can provide the searched information (M5) for purchasing the product to a user by displaying the information on the display unit 15a. For example, if the product corresponds to detergent, the smart watch 100 can provide the user with information (M5) such as a product name, volume of the product, a cheapest price, online shopping mall selling the product with the cheapest price, and the like. Moreover, a cart (or, shopping basket) directly associated with the online shopping mall and an option (M5) for direct buying can also be provided to the user. In particular, if the user obtains an image of a product, the user can immediately and conveniently purchase the product.

While the present specification has been described and illustrated herein with reference to the preferred embodiments and diagrams thereof, the present specification may be non-limited to the aforementioned embodiments and it will be apparent to those skilled in the art that various modifications and variations can be made therein without departing from the spirit and scope of the present specification. Thus, it is intended that the present specification covers the modifications and variations of this invention that come within the scope of the appended claims and their equivalents.

What is claimed is:

1. A smart watch, comprising:
a case;
a display configured to be positioned at the case and display various information containing current time;
a band configured to be connected to the case and wrap around a wrist of a user; and
a camera configured to be provided to the band separate from the case and the display and to capture an image, the camera configured to move relative with respect to the case and the display together with the band while the camera and the band are placed on the wrist of the user, to make the camera to be precisely oriented towards a subject,
wherein when the camera moves with respect to the case or a distance between the case and the camera is changed, the camera is configured to be activated, and
wherein the camera is configured to move away from the case and the display or move towards the case and the display, while the camera and the band are placed on the wrist of the user.

2. The smart watch of claim 1, wherein the band is configured to move with respect to the case and the display along a circumference direction of the wrist of the user together with the camera by passing through the case, while the camera and the band are placed on the wrist of the user.

3. The smart device of claim 2, wherein the camera and the band are configured to move together with respect to the case and the display while the camera and the band are wound on the wrist of the user.

4. The smart device of claim 2, further comprising a sensor disposed at the case to directly face the wrist of the user,
wherein the band is configured not to be interfered with the sensor.

5. The smart device of claim 4, wherein the band is configured to pass between the wrist of the user and the sensor and includes a slot extending in the circumference direction of the wrist of the user and exposing the sensor therethrough while the band moves, such that the sensor directly faces the wrist of the user, or
wherein the band is configured to pass between the sensor and the display so as to not be interposed between the sensor and the wrist of the user.

6. The smart device of claim 1, wherein the case comprises a first bar and a second bar installed in a body of the case and wherein the band is configured to wind up the first bar, wrap around the wrist of the user, and wind up the second bar to move in a circumference direction of the wrist of the user.

7. The smart device of claim 1, wherein the case comprises a first bar installed in a body of the case, wherein the band comprises a third bar installed in a body of the band, and wherein the band comprises a belt winding up the first bar and the third bar to move in a circumference direction of the wrist of the user.

8. The smart device of claim 1, wherein the camera is attached to the band in a detachable manner,
wherein the camera is configured to be clamped with the band, or
wherein the camera is slidably coupled with the band.

9. The smart device of claim 1, wherein the band is configured by a plurality of sections coupled each other in a detachable manner and wherein a plurality of the sections comprise a first section containing the camera.

10. The smart device of claim 1, further comprising a sensor configured to sense a movement of the camera with respect to the case or a change of the distance between the case and the camera.

11. A method of controlling a smart watch, the smart watch including a case, a band configured to be connected to the case and wrap around a wrist of a user, and a camera configured to be provided to the band and move with respect to the case together with the band while the camera and the band are placed on the wrist of the user, the method comprising the steps of:
sensing a movement of the camera with respect to the case or a change of a distance between the case and the camera;
when the camera moves with respect to the case or a distance between the case and the camera is changed, activating the camera to obtain an image;
receiving an instruction for performing an operation related to the obtained image; and
performing the operation related to the obtained image,
wherein the sensed movement comprises a movement that moves the camera away from the case and the display or moves the camera towards the case and the display, while the camera and the band are placed on the wrist of the user.

12. The method of claim 11, wherein the sensed movement comprises a movement that moves the band with respect to the case along a circumference direction of the wrist of the user together with the camera by passing through the case, while the camera and the band are placed on the wrist of the user, or
wherein the sensed movement comprises a movement that arranges the camera to a different position of the band from a point of the band.

13. The method of claim 11, if the instruction is not received from the user during a prescribed time after the camera is activated, further comprising the step of deactivating the camera.

14. The method of claim 11, wherein the receiving step and the performing step comprise the steps of:
if the camera obtains an image of a person, automatically focusing on the person in the camera; and
capturing a picture of the person according to manipulation of a prescribed user, and wherein the capturing step comprises the steps of:
arranging the person to the center of the image before the picture of the person is captured; and/or
adjusting an image to be captured according to a prescribed condition.

15. The method of claim 11, wherein the receiving step and the performing step comprise the steps of:
if the camera obtains an image of an object or a person, searching for information on the object or the person according to manipulation of a prescribed user; and
providing the searched information to the user.

16. The method of claim 11, wherein if the camera obtains an image of an object or a person, the receiving step and the performing step comprise the step of applying the image to a face of the smart watch according to manipulation of a prescribed user.

17. The method of claim 11, wherein the receiving step and the performing step comprise the steps of:
if the camera obtains an image of a bar code, automatically recognizing the bar code; and
displaying information associated with the bar code on a display, and
wherein if the information associated with the bar code corresponds to information on a product, the receiving step and the performing step further comprises the step of additionally providing information for purchasing the product.

* * * * *